United States Patent
Zhang et al.

(10) Patent No.: US 10,123,066 B2
(45) Date of Patent: Nov. 6, 2018

(54) MEDIA PLAYBACK METHOD, APPARATUS, AND SYSTEM

(71) Applicant: Huawei Device (Dongguan) Co., Ltd., Dongguan (CN)

(72) Inventors: Qinliang Zhang, Shenzhen (CN); Yu Zhu, Shenzhen (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 13 days.

(21) Appl. No.: 14/981,032

(22) Filed: Dec. 28, 2015

(65) Prior Publication Data

US 2016/0112746 A1    Apr. 21, 2016

Related U.S. Application Data

(63) Continuation of application No. PCT/CN2014/082121, filed on Jul. 14, 2014.

(30) Foreign Application Priority Data

Aug. 20, 2013  (CN) .......................... 2013 1 0364535
Feb. 18, 2014  (CN) .......................... 2014 1 0054046

(51) Int. Cl.
  *H04N 7/18*    (2006.01)
  *H04N 21/414*  (2011.01)
  (Continued)

(52) U.S. Cl.
  CPC ... *H04N 21/41407* (2013.01); *H04N 21/4122* (2013.01); *H04N 21/4126* (2013.01);
  (Continued)

(58) Field of Classification Search
  CPC combination set(s) only.
  See application file for complete search history.

(56) References Cited

U.S. PATENT DOCUMENTS 8,649,659 B2 * 2/2014 Lalwaney .......... H04L 65/4084
  386/241
8,752,206 B2 * 6/2014 Joseph ............... H04N 21/2541
  713/150
(Continued)

FOREIGN PATENT DOCUMENTS

CN    101102202 A    1/2008
CN    101309237 A    11/2008
(Continued)

OTHER PUBLICATIONS

Foreign Communication From a Counterpart Application, Chinese Application No. 201410054046.1, Chinese Office Action dated Jul. 4, 2016, 10 pages.
(Continued)

*Primary Examiner* — Alexander Gee
(74) *Attorney, Agent, or Firm* — Conley Rose, P.C.

(57) ABSTRACT

A media playback method, so as to implement seamless playback of media information, is presented. The media playback method includes: determining a first location relationship between a target object and a first terminal; when the first location relationship meets a first preset condition, determining a second location relationship between a second terminal and the target object; and when the second location relationship meets a second preset condition, sending media information currently played on the first terminal to the second terminal, to enable the second terminal to play the media information. By using the foregoing technical solution, seamless playback of media information among multiple screens is implemented, thereby providing personalized data services and applications to a target object, and improving efficiency of acquiring media information by a target object.

13 Claims, 10 Drawing Sheets

(51) Int. Cl.

| | |
|---|---|
| *H04N 21/41* | (2011.01) |
| *H04N 21/436* | (2011.01) |
| *H04N 21/442* | (2011.01) |
| *H04N 21/45* | (2011.01) |
| *H04N 21/858* | (2011.01) |
| *H04N 21/63* | (2011.01) |
| *H04N 21/6587* | (2011.01) |
| *H04N 21/4223* | (2011.01) |
| *H04N 21/4415* | (2011.01) |

(52) U.S. Cl.
CPC . *H04N 21/43615* (2013.01); *H04N 21/44218* (2013.01); *H04N 21/4524* (2013.01); *H04N 21/8586* (2013.01); *H04N 21/4223* (2013.01); *H04N 21/4415* (2013.01); *H04N 21/632* (2013.01); *H04N 21/6587* (2013.01)

(56) References Cited

U.S. PATENT DOCUMENTS

| | | | |
|---|---|---|---|
| 9,104,408 | B2 | 8/2015 | Oba et al. |
| 9,129,148 | B1* | 9/2015 | Li .................. G06K 9/00268 |
| 2007/0299976 | A1 | 12/2007 | Zafar et al. |
| 2008/0158612 | A1* | 7/2008 | Iwasaki ................ G06T 11/60 |
| | | | 358/3.26 |
| 2011/0050926 | A1* | 3/2011 | Asano ................. G06F 21/36 |
| | | | 348/211.2 |
| 2011/0129196 | A1* | 6/2011 | Hayashi ............. H04L 12/2812 |
| | | | 386/234 |
| 2011/0283334 | A1* | 11/2011 | Choi ................... G06F 3/04883 |
| | | | 725/148 |
| 2011/0316790 | A1 | 12/2011 | Ollila et al. |
| 2013/0142402 | A1* | 6/2013 | Myers ................ G06K 9/00288 |
| | | | 382/118 |
| 2014/0153836 | A1* | 6/2014 | Tobita ................. G06T 13/80 |
| | | | 382/218 |
| 2015/0185856 | A1 | 7/2015 | Liu et al. |
| 2015/0304712 | A1 | 10/2015 | Liu |
| 2015/0334456 | A1 | 11/2015 | Liu et al. |

FOREIGN PATENT DOCUMENTS

| | | |
|---|---|---|
| CN | 101377814 A | 3/2009 |
| CN | 101714924 A | 5/2010 |
| CN | 102119530 A | 7/2011 |
| CN | 102866777 A | 1/2013 |
| CN | 102984592 A | 3/2013 |
| CN | 103019555 A | 4/2013 |
| CN | 103037244 A | 4/2013 |
| CN | 103780970 A | 5/2014 |
| EP | 2930937 A1 | 10/2015 |

OTHER PUBLICATIONS

Foreign Communication From a Counterpart Application, Chinese Application No. 201410054046.1, Chinese Search Report dated Jun. 23, 2016, 2 pages.
Partial English Translation and Abstract of Chinese Patent Application No. CN103780970, Dec. 10, 2015, 4 pages.
Foreign Communication From a Counterpart Application, Chinese Application No. 14838315.1, Extended European Search Report dated Apr. 4, 2016, 8 pages.
Foreign Communication From a Counterpart Application, PCT Application No. PCT/CN2014/082121, English Translation of International Search Report dated Sep. 1, 2014, 2 pages.
Foreign Communication From a Counterpart Application, PCT Application No. PCT/CN2014/082121, English Translation of Written Opinion dated Aug. 29, 2014, 9 pages.
Foreign Communication From a Counterpart Application, Chinese Application No. 2014100540461, Chinese Search Report dated Feb. 14, 2017, 3 pages.
Foreign Communication From a Counterpart Application, Chinese Application No. 2014100540461, Chinese Office Action dated Feb. 23, 2017, 12 pages.
Machine Translation and Abstract of Chinese Publication No. CN101102202, Jan. 9, 2008, 15 pages.
Machine Translation and Abstract of Chinese Publication No. CN101309237, Nov. 19, 2008, 12 pages.
Machine Translation and Abstract of Chinese Publication No. CN101714924, May 26, 2010, 26 pages.
Foreign Communication From a Counterpart Application, Chinese Application No. 201410054046.1, Chinese Notice of Allowance dated Dec. 19, 2017, 4 pages.

* cited by examiner

MEDIA PLAYBACK METHOD, APPARATUS, AND SYSTEM

CROSS-REFERENCE TO RELATED APPLICATIONS

This application is a continuation of International Application PCT/CN2014/082121, filed on Jul. 14, 2014, which claims priority to Chinese Patent Application No. 201310364535.2, filed on Aug. 20, 2013 and Chinese Patent Application No. 201410054046.1, filed on Feb. 18, 2014, all of which are hereby incorporated by reference in their entireties.

TECHNICAL FIELD

The present disclosure relates to the field of multimedia information, and in particular, to a media playback method, apparatus, and system.

BACKGROUND

With widespread popularity and application of terminals and digital home terminals, in a digital home service, when a user watches an on-demand television program or watches a live television program on a digital television, a mobile phone can record the program being played on the digital television, and using an application (APP) on the mobile phone, for the television program being played on the digital television, the user may make a comment on or share the television program, view a brief introduction of the program, or take a satisfaction vote.

At present, when needing to leave a digital television for a reason, a user turns off the digital television or leaves the digital television on. In such a manner of watching a digital television program, differentiated services and personalized applications cannot be provided to the user, resulting in poor user experience.

SUMMARY

In view of this, an objective of the present disclosure is to provide a media playback method, apparatus, and system, so as to implement seamless playback of media information among multiple screens, thereby providing personalized data services and applications to a target object, and improving efficiency of acquiring media information by a target object.

According to a first aspect, a media playback method is provided, including determining a first location relationship between a target object and a first terminal; when the first location relationship meets a first preset condition, determining a second location relationship between a second terminal and the target object; and when the second location relationship meets a second preset condition, sending media information currently played on the first terminal to the second terminal, to enable the second terminal to play the media information.

In a first possible implementation manner, the determining a first location relationship between a target object and a first terminal includes acquiring a preset picture of the target object and a current picture of the target object, and comparing the acquired current picture of the target object with the acquired preset picture of the target object, to obtain the first location relationship.

With reference to the first aspect or the first possible implementation manner of the first aspect, in a second possible implementation manner, the determining a second location relationship between a second terminal and the target object includes sending a detection instruction to the second terminal, where the detection instruction is used for instructing the second terminal to detect the second location relationship between the second terminal and the target object; and obtaining, by the second terminal, the second location relationship according to an image signal detected by a camera; or obtaining, by the second terminal, the second location relationship according to a pressure signal detected by a pressure sensor; or obtaining, by the second terminal, the second location relationship according to a gravity signal detected by a gravity sensor.

With reference to the first aspect and any one of the foregoing possible implementation manners, in a third possible implementation manner, the method further includes, when the second location relationship between the second terminal and the target object meets the second preset condition, receiving a switching instruction, where the switching instruction is sent when the second terminal determines that the second location relationship between the second terminal and the target object meets the second preset condition; and the sending media information currently played on the first terminal to the second terminal includes sending, according to the received switching instruction, the media information currently played on the first terminal to the second terminal.

With reference to the first aspect and any one of the foregoing possible implementation manners, in a fourth possible implementation manner, before the determining a first location relationship between a target object and a first terminal, the method includes receiving an association instruction, where the association instruction carries a preset identifier of the target object and an identifier of the second terminal, and the association instruction is used for associating the preset identifier of the target object with the identifier of the second terminal; and determining an association relationship between the preset identifier of the target object and the identifier of the second terminal according to the preset identifier of the target object.

With reference to the fourth possible implementation manner of the first aspect, in a fifth possible implementation manner, before the determining a second location relationship between a second terminal and the target object, the method further includes acquiring, according to the association relationship between the preset identifier of the target object and the identifier of the second terminal, the identifier, of the second terminal, corresponding to the preset identifier of the target object.

According to a second aspect, a media playback method is provided, including receiving a detection instruction sent by an access terminal, where the detection instruction is sent by the access terminal to a second terminal when a first location relationship between a target object and a first terminal meets a first preset condition; detecting a second location relationship between the second terminal and the target object; when the second terminal determines that the second location relationship between the second terminal and the target object meets a second preset condition, sending a switching instruction to the access terminal, where the switching instruction is used for instructing to send media information currently played on the first terminal to the second terminal for playback; and receiving the media information currently played on the first terminal, and playing the media information.

In a first possible implementation manner of the second aspect, the detecting a second location relationship between the second terminal and the target object includes obtaining, by the second terminal, the second location relationship according to an image signal detected by a camera; or obtaining, by the second terminal, the second location relationship according to a pressure signal detected by a pressure sensor; or obtaining, by the second terminal, the second location relationship according to a gravity signal detected by a gravity sensor.

With reference to the second aspect or the first possible implementation manner of the second aspect, in a second possible implementation manner of the second aspect, before the receiving a detection instruction sent by an access terminal, the method includes sending an association instruction, where the association instruction carries a preset identifier of the target object and an identifier of the second terminal, and the association instruction is used for associating the preset identifier of the target object with the identifier of the second terminal.

According to a third aspect, a media playback access apparatus is provided, including a determining unit, a judging unit, and an interaction unit, where the determining unit is configured to determine a first location relationship between a target object and a first terminal, and determine a second location relationship between a second terminal and the target object; the judging unit is configured to determine that the first location relationship meets a first preset condition, and determine that the second location relationship meets a second preset condition; and the interaction unit is configured to, when the second location relationship meets the second preset condition, send media information currently played on the first terminal to the second terminal, to enable the second terminal to play the media information.

In a first possible implementation manner of the third aspect, the determining unit includes an acquiring unit and a comparison unit, where the acquiring unit is configured to acquire a preset picture of the target object and a current picture of the target object; and the comparison unit is configured to compare the acquired current picture of the target object with the acquired preset picture of the target object, to obtain the first location relationship.

With reference to the third aspect and the first possible implementation manner of the third aspect, in a second possible implementation manner of the third aspect, the apparatus further includes an association unit, where the interaction unit is further configured to receive an association instruction, where the association instruction carries a preset identifier of the target object and an identifier of the second terminal, and the association instruction is used for associating the preset identifier of the target object with the identifier of the second terminal; and the association unit is configured to determine an association relationship between the preset identifier of the target object and the identifier of the second terminal according to the preset identifier of the target object.

With reference to the second possible implementation manner of the third aspect, in a third possible implementation manner of the third aspect, the interaction unit is further configured to acquire, according to the association relationship between the preset identifier of the target object and the identifier of the second terminal, the identifier, of the second terminal, corresponding to the preset identifier of the target object.

According to a fourth aspect, a media playback access apparatus is provided, including a determining unit, a judging unit, and an interaction unit, where the determining unit is configured to determine a first location relationship between a target object and a first terminal; the judging unit is configured to determine that the first location relationship meets a first preset condition; the interaction unit is configured to, when the first location relationship meets the first preset condition, send a detection instruction to a second terminal, where the detection instruction is used for instructing the second terminal to detect a second location relationship between the second terminal and the target object; and is configured to receive a switching instruction, where the switching instruction is sent when the second terminal determines that the second location relationship between the second terminal and the target object meets a second preset condition, and send media information currently played on the first terminal to the second terminal according to the switching instruction.

In a first possible implementation manner of the fourth aspect, the determining unit includes an acquiring unit and a comparison unit, where the acquiring unit is configured to acquire a preset picture of the target object and a current picture of the target object; and the comparison unit is configured to compare the acquired current picture of the target object with the acquired preset picture of the target object, to obtain the first location relationship.

With reference to the fourth aspect and the first possible implementation manner of the fourth aspect, in a second possible implementation manner of the fourth aspect, the apparatus further includes an association unit, where the interaction unit is further configured to receive an association instruction, where the association instruction carries a preset identifier of the target object and an identifier of the second terminal, and the association instruction is used for associating the preset identifier of the target object with the identifier of the second terminal; and the association unit is configured to determine an association relationship between the preset identifier of the target object and the identifier of the second terminal according to the preset identifier of the target object.

With reference to the second possible implementation manner of the fourth aspect, in a third possible implementation manner of the fourth aspect, the interaction unit is further configured to acquire, according to the association relationship between the preset identifier of the target object and the identifier of the second terminal, the identifier, of the second terminal, corresponding to the preset identifier of the target object.

According to a fifth aspect, a media playback apparatus is provided, including an interaction unit, a detection unit, and a playback unit, where the interaction unit is configured to receive a detection instruction sent by an access terminal, where the detection instruction is sent by the access terminal to a second terminal when a first location relationship between a target object and a first terminal meets a first preset condition; when the second terminal determines that a second location relationship between the second terminal and the target object meets a second preset condition, send a switching instruction to the access terminal, where the switching instruction is used for instructing to send media information currently played on the first terminal to the second terminal for playback; and receive the media information currently played on the first terminal; the detection unit is configured to detect the second location relationship between the second terminal and the target object according to the detection instruction; and the playback unit is configured to play the received media information currently played on the first terminal.

In a first possible implementation manner of the fifth aspect, the detection unit is an image detection unit configured to detect an image signal, and obtain the second location relationship between the second terminal and the target object; or a pressure detection unit configured to detect pressure information, and obtain the second location relationship between the second terminal and the target object; or a gravity detection unit configured to detect gravity information, and obtain the second location relationship between the second terminal and the target object.

With reference to the fifth aspect and the first possible implementation manner of the fifth aspect, in a second possible implementation manner of the fifth aspect, the interaction unit is further configured to send an association instruction, where the association instruction carries a preset identifier of the target object and an identifier of the second terminal, and the association instruction is used for associating the preset identifier of the target object with the identifier of the second terminal.

According to a sixth aspect, a media playback system is provided, where the system includes a first terminal, an access terminal, and a second terminal, where the access terminal is configured to determine a first location relationship between a target object and the first terminal; when the first location relationship meets a first preset condition, determine a second location relationship between the second terminal and the target object; and when the second location relationship meets a second preset condition, send media information currently played on the first terminal to the second terminal, to enable the second terminal to play the media information; and the second terminal is configured to receive the media information currently played on the first terminal, and play the media information.

In a first possible implementation manner of the sixth aspect, that the access terminal determines a first location relationship between a target object and the first terminal is acquiring a preset picture of the target object and a current picture of the target object, and comparing the acquired current picture of the target object with the acquired preset picture of the target object, to obtain the first location relationship.

With reference to the sixth aspect and the first possible implementation manner of the sixth aspect, before determining the first location relationship between the target object and the first terminal, the access terminal is further configured to receive an association instruction, where the association instruction carries a preset identifier of the target object and an identifier of the second terminal, and the association instruction is used for associating the preset identifier of the target object with the identifier of the second terminal; and determine an association relationship between the preset identifier of the target object and the identifier of the second terminal according to the preset identifier of the target object.

With reference to the sixth aspect and any one of the foregoing possible implementation manners, the access terminal is further configured to, before the second location relationship between the second terminal and the target object is determined, acquire, according to the association relationship between the preset identifier of the target object and the identifier of the second terminal, the identifier, of the second terminal, corresponding to the preset identifier of the target object.

According to a seventh aspect, a media playback system is provided, where the system includes a first terminal, an access terminal, and a second terminal, where the access terminal is configured to determine a first location relationship between a target object and the first terminal; when the first location relationship meets a first preset condition, send a detection instruction to the second terminal, where the detection instruction is used for instructing the second terminal to detect a second location relationship between the second terminal and the target object; receive a switching instruction, where the switching instruction is sent when the second terminal determines that the second location relationship between the second terminal and the target object meets a second preset condition; and send, according to the received switching instruction, media information currently played on the first terminal to the second terminal, to enable the second terminal to play the media information; and the second terminal is configured to receive the detection instruction sent by the access terminal, where the detection instruction is sent by the access terminal to the second terminal when the first location relationship between the target object and the first terminal meets the first preset condition; detect the second location relationship between the second terminal and the target object; when the second terminal determines that the second location relationship between the second terminal and the target object meets the second preset condition, send the switching instruction to the access terminal, where the switching instruction is used for instructing to send the media information currently played on the first terminal to the second terminal for playback; and receive the media information currently played on the first terminal, and play the media information.

In a first possible implementation manner of the seventh aspect, that the access terminal determines a first location relationship between a target object and the first terminal is acquiring a preset picture of the target object and a current picture of the target object, and comparing the acquired current picture of the target object with the acquired preset picture of the target object, to obtain the first location relationship.

With reference to the seventh aspect and the first possible implementation manner of the seventh aspect, in a second possible implementation manner of the seventh aspect, the detecting, by the second terminal, the second location relationship between the second terminal and the target object includes obtaining, by the second terminal, the second location relationship according to an image signal detected by a camera; or obtaining, by the second terminal, the second location relationship according to a pressure signal detected by a pressure sensor; or obtaining, by the second terminal, the second location relationship according to a gravity signal detected by a gravity sensor.

With reference to the seventh aspect and any one of the foregoing possible implementation manners, in a third possible implementation manner of the seventh aspect, before determining the first location relationship between the target object and the first terminal, the access terminal is further configured to receive an association instruction, where the association instruction carries a preset identifier of the target object and an identifier of the second terminal, and the association instruction is used for associating the preset identifier of the target object with the identifier of the second terminal; and determine an association relationship between the preset identifier of the target object and the identifier of the second terminal according to the preset identifier of the target object.

With reference to the seventh aspect and any one of the foregoing possible implementation manners, in a fourth possible implementation manner of the seventh aspect the access terminal is further configured to: before the second location relationship between the second terminal and the target object is determined, acquire, according to the association relationship between the preset identifier of the target object and the identifier of the second terminal, the identifier, of the second terminal, corresponding to the preset identifier of the target object.

By using the foregoing technical solutions, according to a relationship between a target object and a first terminal and a relationship between the target object and a second terminal, media information currently played on the first terminal is sent to the second terminal, to enable the second terminal to play the media information, so as to implement seamless playback of media information, thereby providing personalized data services and applications to a target object, and improving efficiency of acquiring media information by a target object.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

At present, when watching a digital television and needing to leave the digital television for various reasons, a target object turns off the digital television or leaves the digital television on. In such a manner of watching a digital television program, differentiated services and personalized applications cannot be provided to the target object, resulting in poor experience of the target object. A target object in the embodiments of the present disclosure may be a user, or may be a reference object or the like set by a user. An embodiment of the present disclosure provides a media playback method, so as to implement seamless playback of media information, thereby providing personalized data services and applications to a target object, and improving efficiency of acquiring media information by a target object.

Figure 1:
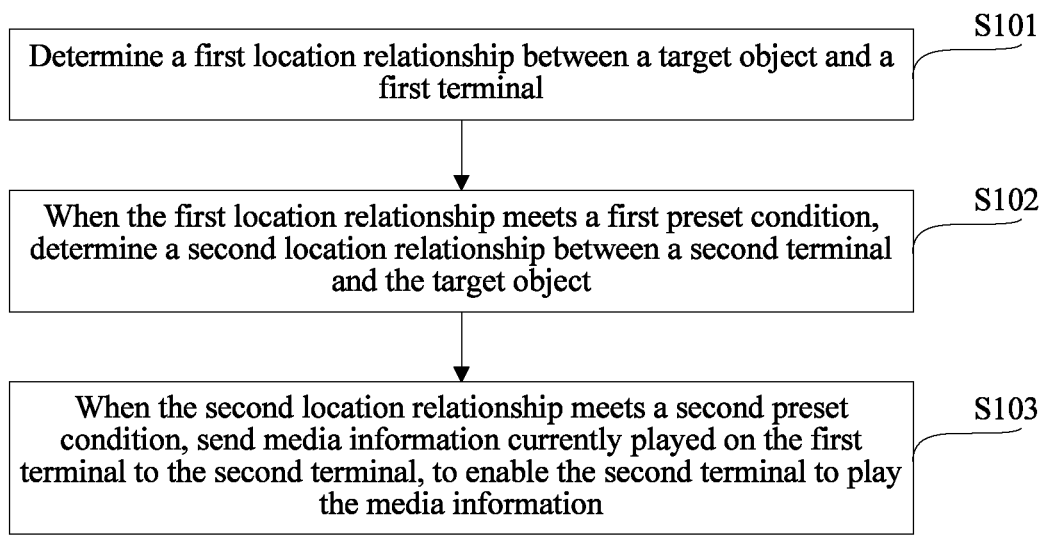
FIG. 1 is a schematic flowchart of a media playback method according to an embodiment of the present disclosure.

FIG. 1 is a schematic flowchart of a media playback method according to an embodiment of the present disclosure. This embodiment is described using an example in which a target object may be a user. The method may be applied to an access terminal, or may be applied to another terminal device. A case of application to an access terminal is used as an example for description below. This embodiment of the media playback method includes the following steps:

S101: Determine a first location relationship between a target object and a first terminal.

The access terminal mentioned in the present disclosure may be a set top box (STB) connected to a digital television having a camera function, or may be a digital television that is integrated with a set top box function and that has a camera function, or an apparatus implementing the foregoing functions. The access terminal may be independent of the first terminal, or may be integrated into the first terminal.

The first terminal mentioned in the present disclosure may be a television, a smartphone, a tablet computer, a smart playback device, a terminal device implementing an equivalent function, or the like.

In this embodiment of the present disclosure, that the access terminal determines a first location relationship between a target object and a first terminal may be where the access terminal compares a current picture, of the target object, taken using the first terminal with a preset picture of the target object, to obtain the first location relationship. The first location relationship may be a degree of similarity or a ratio of overlap between the current picture and the preset picture.

Correspondingly, the determining a first location relationship between a target object and a first terminal may include acquiring a preset picture of the target object and a current picture of the target object, and comparing the acquired current picture of the target object with the acquired preset picture of the target object, to obtain the first location relationship.

In another embodiment of the present disclosure, the comparing the acquired current picture of the target object with the acquired preset picture of the target object may comprise comparing a human face in the acquired current picture of the target object with a human face in the acquired preset picture of the target object.

In another embodiment of the present disclosure, a human face detection method is used to detect possible human face areas in the preset picture of the target object and the current picture of the target object, and human face feature extraction is performed on the detected human face areas in the preset picture of the target object and the current picture of the target object, to extract human face feature information in the preset picture of the target object and the current picture of the target object. After the human face feature information in the preset picture of the target object and the human face feature information in the current picture of the target object are acquired, a distance between the human face feature information in the preset picture of the target object and the human face feature information in the current picture of the target object may be calculated through human face recognition, for example, using a PCA (Principal Component Analysis, principal component analysis)-based human face recognition method. When the distance is greater than a particular threshold, it is determined that the human faces in the preset picture of the target object and the current picture of the target object do not match.

A method for acquiring the preset picture of the target object may be, when the target object is using an application on a second terminal, acquiring, by the second terminal, the preset picture of the target object according to usage of the application software on the second terminal by the target object. For example, when the target object browses, using APP software on a mobile terminal such as a mobile phone, a brief introduction of a video being played on a digital television, or makes a comment on a television program being played, a mobile phone terminal turns on a human face photographing mode according to usage of the APP software, and the mobile phone terminal acquires the preset picture of the target object; or a mobile phone terminal may acquire the preset picture of the target object according to a uniform resource locator (URL) of the received preset picture of the target object, which may include acquiring the preset picture of the target object according to the URL of the preset picture of the target object using an HTTP GET operation instruction in the HTTP protocol.

In another embodiment of the present disclosure, when multiple target objects use an application on the second terminal, preset pictures of the multiple target objects may be acquired. For example, a preset picture of a target object A, a preset picture of a target object B, and a preset picture of a target object C are acquired.

In another embodiment of the present disclosure, the access terminal may perform image preprocessing on the acquired preset picture of the target object, and a method for performing image preprocessing on the preset picture of the target object may comprise performing image preprocessing on the preset picture of the target object using a method such as histogram equalization, median filtering, or normalization.

Next, the possible human face area in the preset picture of the target object may be detected using the human face detection method.

For example, a human face area in the preset picture of the target object A, a human face area in the preset picture of the target object B, and a human face area in the preset picture of the target object C are detected.

Human face feature extraction is performed on the human face area in the detected preset picture of the target object, to extract the human face feature information in the preset picture of the target object. A human face feature extraction method may be a geometric feature extraction method or an algebraic feature extraction method. The algebraic feature extraction method may be a linear subspace method or a nonlinear space method.

For example, human face feature extraction is performed on the human face area in the preset picture of the target object A, and extracted information may be referred to as human face feature information A; human face feature extraction is performed on the human face area in the preset picture of the target object B, and extracted information may be referred to as human face feature information B; human face feature extraction is performed on the human face area in the preset picture of the target object C, and extracted information may be referred to as human face feature information C.

A method for acquiring the current picture of the target object may be acquiring, by the access terminal, the current picture of the target object through photographing; or may be obtaining, by the first terminal, the current picture of the target object through photographing, and acquiring, by the access terminal, the current picture of the target object sent by the first terminal.

For example, the acquired current picture of the target object is compared with the acquired preset picture of the target object; when a comparison result shows that a degree of similarity is less than 80%, it indicates that the first location relationship meets a first preset condition.

In another embodiment of the present disclosure, that the first location relationship meets a first preset condition may be a human face in the preset picture of the target object matches none of human faces in the current picture of the target object, or there may be zero human faces in the current picture of the target object.

In another embodiment of the present disclosure, the access terminal may perform image preprocessing on the acquired current picture of the target object. A method for performing image preprocessing on the current picture of the target object may include performing image preprocessing on the current picture of the target object using a method such as histogram equalization, median filtering, or normalization.

Next, the possible human face area in the current picture of the target object may be detected using the human face detection method. The current picture of the target object may include zero human faces (no human is in front of the first terminal), one human face (one human is in front of the first terminal), or multiple human faces (multiple humans are in front of the first terminal).

For example, a human face area A and a human face area E in the current picture of the target object are detected.

Human face feature extraction is performed on the human face area in the detected current picture of the target object, to extract the human face feature information in the current picture of the target object. A human face feature extraction method may be a geometric feature extraction method or an algebraic feature extraction method. The algebraic feature extraction method may be a linear subspace method or a nonlinear space method.

For example, human face feature extraction is performed on the human face area A in the current picture of the target object, and extracted information may be referred to as human face feature information A of the current picture; human face feature extraction is performed on the human face area E in the current picture of the target object, and extracted information may be referred to as human face feature information E of the current picture.

After the human face feature information in the preset picture of the target object and the human face feature information in the current picture of the target object are acquired, a distance between the human face feature information in the preset picture of the target object and the human face feature information in the current picture of the target object may be calculated through human face recognition, for example, using a PCA (Principal Component Analysis, principal component analysis)-based human face recognition method. When the distance is greater than a particular threshold, it is determined that the human faces in the preset picture of the target object and the current picture of the target object do not match; otherwise, it is determined that the human faces in the preset picture of the target object and the current picture of the target object match. There may be zero, one, or multiple human faces in the current picture of the target object. When the human face in the preset picture of the target object matches none of human faces in the current picture of the target object, or there may be zero human faces in the current picture of the target object, it indicates that the first location relationship between the target object and the first terminal meets the first preset condition; otherwise, it indicates that the first location relationship between the target object and the first terminal does not meet the first preset condition. When the first location relationship between the target object and the first terminal does not meet the first preset condition, subsequent steps S102 and S103 are skipped. That is, when it is determined that the user is watching a program in front of the first terminal, subsequent steps S102 and S103 are skipped. For example, through human face recognition, a distance (which may be referred to as a distance D1) between the human face feature information A in the preset picture and the human face feature information A in the current picture and a distance (which may be referred to as a distance D2) between the human face feature information A in the preset picture and the human face feature information E in the current picture are calculated separately. Assuming that the distance D1 is not greater than a particular threshold, it is determined that the human face in the preset picture of the target object A matches a human face A in the current picture of the target object, and it indicates that the first location relationship between the target object and the first terminal does not meet the first preset condition. Specifically, it may indicate that a user A is watching a program in front of the first terminal. The first terminal may be a television. Similarly, through human face recognition, whether a user B or a user C is watching the program in front of the television may be determined.

In another embodiment of the present disclosure, before the determining a first location relationship between a target object and a first terminal, the method may further include receiving an association instruction, where the association instruction carries a preset identifier of the target object and an identifier of the second terminal, and the association instruction is used for associating the preset identifier of the target object with the identifier of the second terminal; and determining an association relationship between the preset identifier of the target object and the identifier of the second terminal according to the preset identifier of the target object.

The second terminal mentioned in the present disclosure may be a smartphone, a tablet computer, a smart playback device, a television, a terminal device implementing an equivalent function, or the like.

The identifier of the second terminal mentioned in the present disclosure may be a universally unique identifier (UUID) of the second terminal and an Internet Protocol address of the second terminal.

The preset identifier of the target object may be a URL of the preset picture of the target object.

The determining an association relationship between the preset identifier of the target object and the identifier of the second terminal according to the preset identifier of the target object may be creating a data association table of the association relationship between the URL of the preset picture of the target object and the identifier of the second terminal according to the uniform resource locator of the preset picture of the target object.

The association instruction received by the access terminal may be sent by the second terminal; or a control device may be set between the access terminal and the second terminal, the second terminal sends the association instruction to the control device, and the control device sends the received association instruction to the access terminal.

A process of receiving the association instruction by the access terminal may be receiving, by the access terminal, an association instruction packet using a Universal Plug and Play (UPnP) protocol, where an instruction in the association instruction packet carries the URL of the preset picture of the target object, the UUID of the second terminal, and the Internet Protocol address of the second terminal. The instruction in the association instruction packet may be defined as AVT::Set Second Screen Info( ), and the instruction AVT::Set Second Screen Info( ) carries parameters such as the URL of the preset picture of the target object, the UUID of the second terminal, and the Internet Protocol address of the second terminal. The association instruction may also be sent using another protocol, such as the DLNA protocol or the Intelligent Grouping and Resource Sharing (IGRS) protocol. A protocol for receiving the association instruction may be replaceable and changeable, which is not limited in this embodiment of the present disclosure.

In another embodiment of the present disclosure, the access terminal may receive multiple association instructions, and the multiple association instructions are sent by multiple second terminals. For example, multiple users are watching, at the same time, a television program played on the first terminal, and the second terminals carried by the multiple users may send, to the first terminal, association instructions carrying URLs of preset pictures of the users, UUIDs of the second terminals, and Internet Protocol addresses of the second terminals. For example, the user A, the user B, and the user C separately send an association instruction to the access terminal (in Table 1, the user A may correspond to a first record, the user B may correspond to a second record, and the user C may correspond to a third record).

The creating a data association table of the association relationship between the URL of the preset picture of the target object and the identifier of the second terminal may include creating, by the access terminal according to the received association instruction, the data association table of the association relationship between the URL of the preset picture of the target object and the identifier of the second terminal. In the present disclosure, a form of the association table is not limited. For example, the association table may be created in a form shown in the following table, and for the URL of the preset picture of the target object, the UUID of the second terminal, and the Internet Protocol address of the second terminal, reference is made to Table 1.

TABLE 1

| Device identifier | Device IP address | Target object URL |
| --- | --- | --- |
| Phone_UUID1 | Phone_Ipaddress1 | Phone_Name1_URL |
| Phone_UUID2 | Phone_Ipaddress2 | Phone_Name2_URL |

TABLE 1-continued

| Device identifier | Device IP address | Target object URL |
|---|---|---|
| Phone_UUID3 | Phone_Ipaddress3 | Phone_Name3_URL |
| Phone_UUID4 | Phone_Ipaddress4 | Phone_Name4_URL |
| . | . | . |
| . | . | . |
| . | . | . |

In another embodiment of the present disclosure, after the first location relationship between the target object and the first terminal is determined, the data association table, for example, Table 1, may be queried, so as to determine whether a UUID of the second terminal and Internet Protocol address information of the second terminal that correspond to a URL of a preset picture of the target object exist in the data association table. If the URL of the preset picture of the target object, the corresponding UUID of the second terminal, and a corresponding Internet Protocol address of the second terminal exist in the data association table, it is recorded that a state of the target object is "watching a video". If a URL of a taken picture of the target object, a corresponding UUID of the second terminal, and a corresponding Internet Protocol address of the second terminal do not exist in the data association table, the access terminal updates the data association table, creates a data association table of an association relationship among the URL of the preset picture of the target object, the UUID of the second terminal, and the Internet Protocol address of the second terminal, and records that a state of the target object is "watching a video".

S102: When the first location relationship meets a first preset condition, determine a second location relationship between a second terminal and the target object.

In this embodiment of the present disclosure, the access terminal may determine the second location relationship between the second terminal and the target object. For example, the access terminal may detect the second location relationship between the second terminal and the target object using a camera, or may detect the second location relationship between the second terminal and the target object using an infrared probe.

In another embodiment of the present disclosure, the access terminal may send a detection instruction to the second terminal according to an identifier, of the second terminal, corresponding to a preset picture of the target object in the data association table, to instruct the second terminal to detect the second location relationship between the second terminal and the target object; or the access terminal may send a detection instruction to the control device, and the control device then sends the detection instruction to the second terminal, to instruct the second terminal to detect the second location relationship between the second terminal and the target object.

For example, when it is determined through human face recognition that a first location relationship between the user B and the first terminal and a first location relationship between the user C and the first terminal meet the first preset condition, a second location relationship between the user B and the second terminal and a second location relationship between the user C and the second terminal are determined. That is, when it is determined through human face recognition that the user B is not watching a program in front of the first terminal and the user C is not watching a program in front of the first terminal, whether the user B carries a mobile phone and whether the user C carries a mobile phone can be further determined.

The detection instruction carries the UUID of the second terminal and the Internet Protocol address of the second terminal that correspond to the acquired preset picture of the target object.

A process of sending the detection instruction by the access terminal may be sending, by the access terminal, a detection instruction packet using a UPnP protocol, where an instruction in the detection instruction packet carries the UUID of the second terminal and the Internet Protocol address of the second terminal that correspond to the acquired preset picture of the target object. The instruction in the detection instruction packet may be defined as AVT:: Set Get Device Status( ), and the instruction AVT::Set Get Device Status( ) carries parameters such as the UUID of the second terminal and the Internet Protocol address of the second terminal. The detection instruction may also be sent using another protocol, such as the DLNA protocol or the Intelligent Grouping and Resource Sharing (IGRS) protocol. The protocol for sending the detection instruction may be replaceable and changeable, which is not limited in this embodiment of the present disclosure.

In another embodiment of the present disclosure, the process of sending the detection instruction by the access terminal may further be the access terminal sends a detection instruction packet using a UPnP protocol, where the instruction in the detection instruction packet may be AVT::GetDeviceStatus( ).

In this embodiment of the present disclosure, that the second terminal detects the second location relationship between the second terminal and the target object may be obtaining, by the second terminal, the second location relationship between the second terminal and the target object according to an image signal detected by a camera; or obtaining the second location relationship between the second terminal and the target object according to a pressure signal detected by a pressure sensor, and determining whether the target object is holding the second terminal; or obtaining the second location relationship between the second terminal and the target object according to a gravity signal detected by a gravity sensor, and determining whether the target object is moving with the second terminal held.

For example, the second terminal may perform human face recognition according to the image signal detected by the camera, obtain the second location relationship between the second terminal and the target object according to a result of the human face recognition, and determine whether the target object is holding the second terminal.

For another example, the second terminal may obtain the second location relationship between the second terminal and the target object according to the pressure signal detected by the pressure sensor and according to the pressure signal. The second terminal obtains the second location relationship between the second terminal and the target object according to the pressure signal X detected by the pressure sensor and according to a detected value, and determines whether the target object is holding the second terminal.

For still another example, the second terminal may obtain the second location relationship between the second terminal and the target object according to the gravity signal detected by the gravity sensor. The second terminal obtains the second location relationship between the second terminal and the target object according to the gravity signal Y detected by the gravity sensor and according to a detected value, and determines whether the target object is moving with the second terminal held.

S103: When the second location relationship meets a second preset condition, send media information currently played on the first terminal to the second terminal, to enable the second terminal to play the media information.

In this embodiment of the present disclosure, after determining that the second location relationship meets the second preset condition, the access terminal may send the media information currently played on the first terminal to the second terminal, to enable the second terminal to play the media information.

In another embodiment of the present disclosure, after the access terminal sends the detection instruction to the second terminal and the second terminal detects the second location relationship between the second terminal and the target object, the second terminal sends a switching instruction to the access terminal, and the access terminal receives the switching instruction, where the switching instruction is sent when the second terminal determines that the second location relationship between the second terminal and the target object meets the second preset condition.

The received switching instruction sent by the second terminal may be sent when the second terminal determines that the second location relationship between the second terminal and the target object meets the second preset condition.

In this embodiment of the present disclosure, the second preset condition may be set by the target object when the target object is using an APP related to the second terminal. For example, the second preset condition may be set as a distance between the target object and the second terminal meets a particular range condition, for example, the second preset condition is 0 meters to 0.5 meters; or the second preset condition may be set according to human face recognition, a value of pressure, a value of gravity, and the like.

In this embodiment of the present disclosure, that the second terminal determines that the second location relationship between the second terminal and the target object meets the second preset condition may be determining, by the second terminal, that the target object is using an APP related to a second screen of the second terminal; and if the target object is using a second screen function and the second screen function is running in a foreground, sending, by the second terminal, the switching instruction.

In another embodiment of the present disclosure, that the second terminal determines that the second location relationship between the second terminal and the target object meets the second preset condition may be sending, by the second terminal to the target object, an instruction of selecting whether to perform switching, confirming, by the target object, whether to perform switching, and if the target object determines to perform switching of media information, sending, by the second terminal, the switching instruction.

The media information currently played on the first terminal is sent to the second terminal according to the received switching instruction, to enable the second terminal to play the media information.

The media information may be multimedia information, for example, video information.

The media information may be from a home network, a media server on a network side, or the like.

The sending media information currently played on the first terminal to the second terminal according to the received switching instruction may comprise performing capability negotiation according to the received switching instruction and according to a media capability of the access terminal and a media capability of the second terminal, and sending a uniform resource locator of the media information currently played on the first terminal to the second terminal according to the media capability of the second terminal; or converting, according to a media capability of the second terminal, a media information data stream of the media information currently played on the first terminal into a media information data stream for playback on the second terminal, and sending the converted media information data stream to the second terminal.

In another embodiment of the present disclosure, the media information currently played on the first terminal is on-demand media information, and the sending media information currently played on the first terminal to the second terminal according to the received switching instruction may also comprise receiving, by the access terminal, a capability negotiation packet sent by the second terminal, so as to instruct the access terminal and the second terminal to perform capability negotiation, where a purpose of the capability negotiation may be that the access terminal determines whether the second terminal has a capability of playing the on-demand media information. After the access terminal and the second terminal determine a capability negotiation capability, the second terminal establishes a communication connection with the access terminal according to a sent communication connection packet. The second terminal sends an instruction packet to the access terminal using a UPnP protocol, where an instruction in the instruction packet may be defined as AVT::Get Position Info( ), and acquires a URL of the media information currently played on the first terminal and a playback time point of the media information currently played. The second terminal acquires, according to the acquired URL of the media information currently played and the acquired playback time point of the media information currently played and using an HTTP GET operation instruction in the HTTP protocol, the media information currently played from a media server or a device integrated with a media server function, so as to play the media information.

In another embodiment of the present disclosure, the media information currently played on the first terminal is live media information, and the sending media information currently played on the first terminal to the second terminal according to the received switching instruction, to enable the second terminal to play the media information may also comprise sending, by the second terminal, a capability negotiation packet to the access terminal, so as to instruct the access terminal and the second terminal to perform capability negotiation, where a purpose of the capability negotiation may be that the access terminal determines a coding scheme in which the second terminal plays the live media information. After determining the coding scheme in which the second terminal plays the live media information, the access terminal converts a data code stream of the live media information, so that the second terminal can perform playback in the coding scheme. The second terminal establishes a communication connection with the access terminal according to a sent communication connection packet, converts a media information data stream of the media information currently played on the first terminal into a media information data stream for playback on the second terminal, and sends the converted media information data stream to the second terminal. The second terminal receives the converted media information data stream and plays the media information.

For example, when the user B is not watching a program in front of the first terminal and the user C is not watching the program in front of the first terminal, and when it is determined that the user B carries a mobile phone and that the user C carries a mobile phone, the program is switched to the mobile phone carried by the user B and the mobile phone carried by the user C for playback.

In this embodiment of the media playback method of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

In the following embodiments of the present disclosure, when the first location relationship meets the first preset condition, an example in which the first terminal sends the detection instruction to the second terminal, to instruct the second terminal to detect the second location relationship between the second terminal and the target object is used for description.

Figure 2:
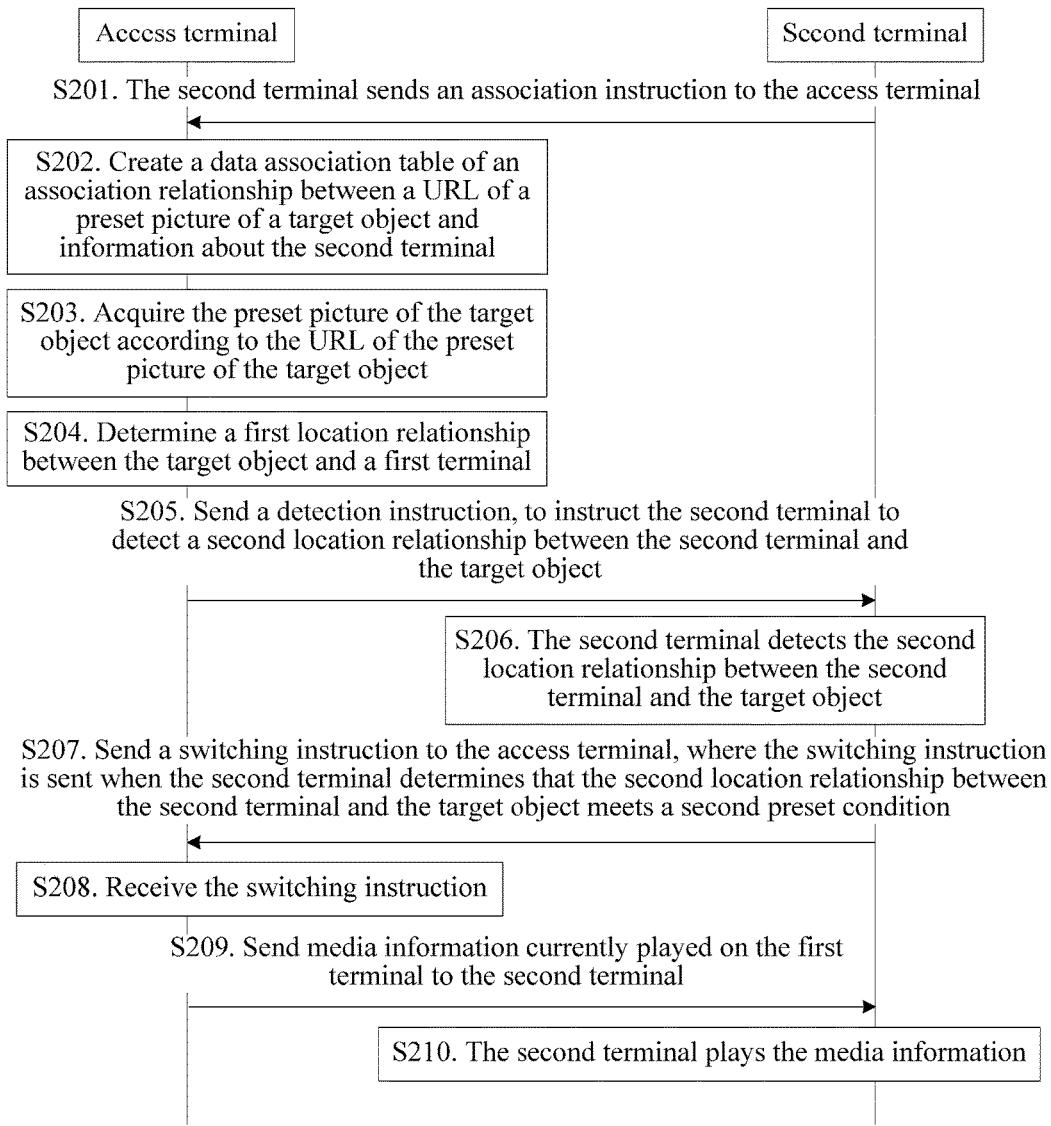
FIG. 2 is a schematic flowchart of a media playback method according to another embodiment of the present disclosure.

FIG. 2 is a schematic flowchart of a media playback method according to another embodiment of the present disclosure. It should be noted that in this embodiment of the present disclosure, there may be multiple second terminals, and multiple target objects are watching a program. This embodiment of the media playback method includes the following steps:

S201: A second terminal sends an association instruction to an access terminal.

The access terminal may be a STB connected to a digital television having a camera function, or may be a digital television that is integrated with a set top box function and that has a camera function.

The second terminal may be a smartphone, a tablet computer, a smart playback device, a television, a terminal device implementing an equivalent function, or the like. The access terminal may be independent of a first terminal, or may be integrated into a first terminal.

The association instruction carries a preset identifier of a target object and an identifier of the second terminal, and the association instruction is used for associating the preset identifier of the target object with the identifier of the second terminal. An association relationship between the preset identifier of the target object and the identifier of the second terminal is determined according to the preset identifier of the target object.

The preset identifier of the target object may be a URL of a preset picture of the target object.

The identifier of the second terminal may be a UUID of the second terminal and an Internet Protocol address of the second terminal.

A process of sending the association instruction may be sending, by the second terminal, an association instruction packet to the access terminal using a UPnP protocol, where an instruction in the association instruction packet carries the URL of the preset picture of the target object, the UUID of the second terminal, and the Internet Protocol address of the second terminal. The instruction in the association instruction packet may be defined as AVT::Set Second Screen Info( ), and the instruction AVT::Set Second Screen Info( ) carries parameters such as the URL of the preset picture of the target object, the UUID of the second terminal, and the Internet Protocol address of the second terminal. The process of sending the association instruction may also be sending a packet using another protocol, such as the DLNA protocol or the IGRS protocol. The protocol used by the second terminal to send the association instruction to the access terminal may be replaceable and changeable, which is not limited in this embodiment of the present disclosure.

In another embodiment of the present disclosure, second terminals carried by multiple users may separately send an association instruction to the access terminal. For example, a second terminal b carried by a user B and a second terminal c carried by a user C separately send an association instruction to the access terminal.

S202: Create a data association table of an association relationship between a URL of a preset picture of a target object and information about the second terminal.

The access terminal creates the data association table of the association relationship between the URL of the preset picture of the target object and the information about the second terminal according to the received association instruction. A form of the association table is not limited in the present disclosure.

S203: Acquire the preset picture of the target object according to the URL of the preset picture of the target object.

That the access terminal acquires the preset picture of the target object according to the URL of the preset picture of the target object may comprise acquiring the preset picture of the target object according to the URL of the preset picture of the target object using an HTTP GET operation instruction in the HTTP protocol.

In another embodiment of the present disclosure, when URLs of preset pictures of multiple target objects are acquired, the preset pictures of the multiple target objects may be acquired.

S204: Determine a first location relationship between the target object and a first terminal.

The determining a first location relationship between the target object and a first terminal may comprise acquiring the preset picture of the target object and a current picture of the target object, and comparing the acquired current picture of the target object with the acquired preset picture of the target object, to obtain the first location relationship. The first location relationship may be a degree of similarity or a ratio of overlap between the current picture and the preset picture.

A method for acquiring the preset picture of the target object may be, when the target object is using an application on the second terminal, acquiring, by the second terminal, the preset picture of the target object according to usage of the application software on the second terminal by the target object. For example, when the target object browses, using APP software on a mobile terminal such as a mobile phone, a brief introduction of a video being played on a digital television, or makes a comment on a television program being played, a mobile phone terminal turns on a human face photographing mode according to usage of the APP software, and the mobile phone terminal acquires the preset picture of the target object; or a mobile phone terminal may acquire the preset picture of the target object according to a URL of the received preset picture of the target object, which may comprise acquiring the preset picture of the target object according to the URL of the preset picture of the target object using an HTTP GET operation instruction in the HTTP protocol.

A method for acquiring the current picture of the target object may be acquiring, by the access terminal, the current picture of the target object through photographing; or may be obtaining, by the first terminal, the current picture of the target object through photographing, and acquiring, by the access terminal, the current picture of the target object sent by the first terminal.

For example, the acquired current picture of the target object is compared with the acquired preset picture of the target object; when a comparison result shows that a degree of similarity is less than 80%, it indicates that the first location relationship meets a first preset condition.

In another embodiment of the present disclosure, after the first location relationship between the target object and the first terminal is determined, the data association table may be queried, so as to acquire whether a UUID of the second terminal and Internet Protocol address information of the second terminal that correspond to a URL of a preset picture of the target object exist in the data association table. If the URL of the preset picture of the target object, the corresponding UUID of the second terminal, and a corresponding Internet Protocol address of the second terminal exist in the data association table, it is recorded that a state of the target object is "watching a video". If a URL of a taken picture of the target object, a corresponding UUID of the second terminal, and a corresponding Internet Protocol address of the second terminal do not exist in the data association table, the access terminal updates the data association table, creates a data association table of the URL of the preset picture of the target object, the UUID of the second terminal, and the Internet Protocol address of the second terminal, and records that a state of the target object is "watching a video".

In another embodiment of the present disclosure, when the preset pictures of the multiple target objects are acquired, first location relationships between the multiple target objects and the first terminal are determined. That is, when pictures of the multiple users are acquired, whether the multiple users are watching a program in front of the first terminal is determined.

S205: Send a detection instruction, to instruct the second terminal to detect a second location relationship between the second terminal and the target object.

When the first location relationship meets the first preset condition, the detection instruction is sent to the second terminal, where the detection instruction is used for instructing the second terminal to detect the second location relationship between the second terminal and the target object.

The detection instruction carries the UUID of the second terminal and the Internet Protocol address of the second terminal that correspond to the acquired preset picture of the target object.

A process of sending the detection instruction by the access terminal may be sending, by the access terminal, a detection instruction packet using a UPnP protocol, where an instruction in the detection instruction packet carries the UUID of the second terminal and the Internet Protocol address of the second terminal that correspond to the acquired preset picture of the target object. The instruction in the detection instruction packet may be defined as AVT:: Set Get Device Status( ), and the instruction AVT::Set Get Device Status( ) carries parameters such as the UUID of the second terminal and the Internet Protocol address of the second terminal. The detection instruction may also be sent using another protocol, such as the DLNA protocol or the Intelligent Grouping and Resource Sharing (IGRS) protocol. The protocol for sending the detection instruction may be replaceable and changeable, which is not limited in this embodiment of the present disclosure.

In another embodiment of the present disclosure, when it is determined that the multiple users are not watching a program in front of the first terminal, the second terminal is instructed to detect the second location relationship between the second terminal and the target object, that is, the second terminal is instructed to detect whether the user carries the second terminal.

S206: The second terminal detects the second location relationship between the second terminal and the target object.

In this embodiment of the present disclosure, that the second terminal detects the second location relationship between the second terminal and the target object may be the second terminal acquires a picture according to a camera, compares the acquired picture with the preset picture of the target object, and detects that a location relationship between the second terminal and the target object meets a second preset condition; or may be the second terminal detects, according to a pressure sensor, that a location relationship between the second terminal and the target object meets a second preset condition, and determines whether the target object is holding the second terminal; or may be the second terminal detects, according to a gravity sensor, that a location relationship between the second terminal and the target object meets a second preset condition, and determines whether the target object is moving with the second terminal held.

S207: Send a switching instruction to the access terminal, where the switching instruction is sent when the second terminal determines that the second location relationship between the second terminal and the target object meets a second preset condition.

In this embodiment of the present disclosure, capability negotiation of a media capability of the access terminal and a media capability of the second terminal is performed according to the switching instruction.

The switching instruction may carry a Universal Plug and Play protocol.

The Universal Plug and Play protocol packet includes a capability negotiation packet and a communication connection packet.

That the second terminal sends a switching instruction to the access terminal may comprise, when determining that the second location relationship between the second terminal and the target object meets the second preset condition, the second terminal sends the switching instruction to the access terminal.

In this embodiment of the present disclosure, the second preset condition may be set by the target object when the target object is using an APP related to the second terminal. For example, the second preset condition may be set as a distance between the target object and the second terminal meets a particular range condition, for example, the second preset condition is 0 meters to 0.5 meters; or the second preset condition may be set according to human face recognition, a value of pressure, a value of gravity, and the like.

In this embodiment of the present disclosure, that the second terminal determines that the second location relationship between the second terminal and the target object meets the second preset condition may be determining, by the second terminal, that the target object is using an APP related to a second screen of the second terminal; and if the target object is using a second screen function and the second screen function is running in a foreground, sending, by the second terminal, the switching instruction.

In another embodiment of the present disclosure, that the second terminal determines that the second location relationship between the second terminal and the target object meets the second preset condition may be sending, by the second terminal to the target object, an instruction of selecting whether to perform switching, confirming, by the target object, whether to perform switching, and if the target object determines to perform switching of media information, sending, by the second terminal, the switching instruction.

S208: Receive the switching instruction.

The access terminal receives the switching instruction, performs capability negotiation according to the media capability of the access terminal and the media capability of the second terminal, and sends, according to the media capability of the second terminal, a uniform resource locator of media information currently played on the first terminal to the second terminal; or converts, according to the media capability of the second terminal, a media information data stream of the media information currently played on the first terminal into a media information data stream for playback on the second terminal, and sends the converted media information data stream to the second terminal.

In this embodiment of the present disclosure, the media information currently played on the first terminal is on-demand media information, and the access terminal receives the switching instruction, and establishes a communication connection with the second terminal.

The media information may be multimedia information, for example, video information.

The media information may be from a home network, a media server on a network side, or the like.

The switching instruction carries a Universal Plug and Play protocol.

The Universal Plug and Play protocol packet includes a capability negotiation packet and a communication connection packet.

A process of receiving the switching instruction may be receiving, by the access terminal a capability negotiation packet sent by the second terminal, so as to instruct the access terminal and the second terminal to perform capability negotiation, where a purpose of the capability negotiation may be that the access terminal determines whether the second terminal has a capability of playing the on-demand media information. After the access terminal and the second terminal determine a capability negotiation capability, the second terminal establishes a communication connection with the access terminal according to a sent communication connection packet. The second terminal sends an instruction packet to the access terminal using a UPnP protocol, where an instruction in the instruction packet may be defined as AVT::Get Position Info( ), and acquires a URL of the media information currently played on the first terminal and a playback time point of the media information currently played.

In another embodiment of the present disclosure, the media information currently played on the first terminal is live media information, and the access terminal receives the switching instruction, and establishes a communication connection with the second terminal.

The switching instruction carries a Universal Plug and Play protocol.

The Universal Plug and Play protocol packet includes a capability negotiation packet and a communication connection packet.

A process of receiving the switching instruction may be receiving, by the access terminal, a capability negotiation packet sent by the second terminal, so as to instruct the access terminal and the second terminal to perform capability negotiation, where a purpose of the capability negotiation may be that the access terminal determines a coding scheme in which the second terminal plays the live media information. After determining the coding scheme in which the second terminal plays the live media information, the access terminal converts a data code stream of the live media information, so that the second terminal can perform playback in the coding scheme. The second terminal establishes a communication connection with the access terminal according to a sent communication connection packet, converts a media information data stream of the media information currently played on the first terminal into a media information data stream for playback on the second terminal, and sends the converted media information data stream to the second terminal.

S209: Send media information currently played on the first terminal to the second terminal.

According to the media capability, of the second terminal, acquired by the access terminal, the media information currently played on the first terminal is sent to the second terminal.

In this embodiment of the present disclosure, the media information currently played on the first terminal is on-demand media information, and the second terminal plays the media information according to the acquired URL of the media information currently played and the acquired playback time point of the media information currently played.

In another embodiment of the present disclosure, the media information currently played on the first terminal is live media information, a media information data stream of the media information currently played on the first terminal is converted into a media information data stream for playback on the second terminal, and the converted media information data stream is sent to the second terminal.

In another embodiment of the present disclosure, when the first terminal acquires the preset pictures of the multiple target objects, first location relationships between the multiple target objects and the first terminal are determined. That is, when pictures of the multiple users are acquired, whether the multiple users are watching a program in front of the first terminal is determined.

In another embodiment example of the present disclosure, when it is determined that the multiple users are not watching a program in front of the first terminal and the second terminals detect that the multiple users separately carry the second terminals, the media information currently played on the first terminal is switched to the second terminals carried by the multiple users.

S210: The second terminal plays the media information.

When the media information played on the first terminal is on-demand media information, the second terminal plays the media information according to the acquired URL of the media information currently played and the acquired playback time point of the media information currently played.

The playing the media information may comprise acquiring, by the second terminal according to the acquired URL of the media information currently played on the first terminal and using an HTTP GET operation instruction in the HTTP protocol, the media information currently played from a media server or a device integrated with a media server function, and playing the media information.

When the media information played on the first terminal is live media information, a media information data stream of the media information currently played on the first terminal is converted into a media information data stream for playback on the second terminal, and the converted media information data stream is sent to the second terminal. The second terminal receives the converted media information data stream, and plays the media information.

In this embodiment of the media playback method of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 3:
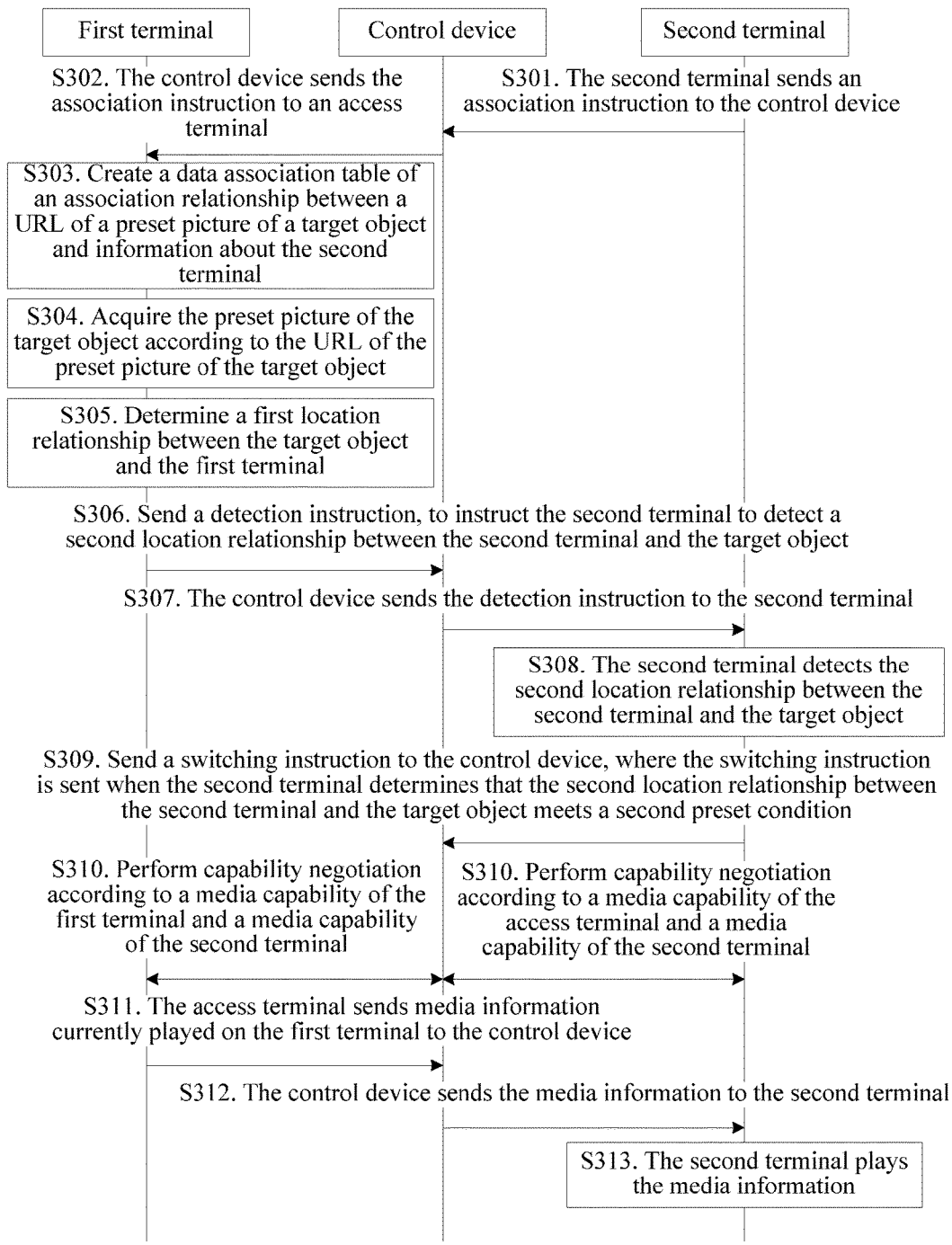
FIG. 3 is a schematic flowchart of a media playback method according to another embodiment of the present disclosure.

FIG. 3 is a schematic flowchart of a media playback method according to another embodiment of the present disclosure. One control device or a device integrated with a control point function is set between an access terminal and a second terminal, and this embodiment of the media playback method includes the following steps:

S301: A second terminal sends an association instruction to a control device.

The control device may be a device integrated with a control point function, such as a remote control of a digital television, and a remote control device controlling a set top box (Set Top Box, STB).

The second terminal may be a smartphone, a tablet computer, a smart playback device, a television, a terminal device implementing an equivalent function, or the like.

The association instruction carries a preset identifier of a target object and an identifier of the second terminal, and the association instruction is used for associating the preset identifier of the target object with the identifier of the second terminal. An association relationship between the preset identifier of the target object and the identifier of the second terminal is determined according to the preset identifier of the target object.

The preset identifier of the target object may be a URL of a preset picture of the target object.

The identifier of the second terminal may be a UUID of the second terminal and an Internet Protocol address of the second terminal.

A process of sending the association instruction may be sending, by the second terminal, an association instruction packet to the access terminal using a UPnP protocol, where an instruction in the association instruction packet carries the URL of the preset picture of the target object, the UUID of the second terminal, and the Internet Protocol address of the second terminal. The instruction in the association instruction packet may be defined as AVT::Set Second Screen Info( ), and the instruction AVT::Set Second Screen Info( ) carries parameters such as the URL of the preset picture of the target object, the UUID of the second terminal, and the Internet Protocol address of the second terminal. The process of sending the association instruction may also be sending a packet using another protocol, such as the DLNA protocol or the IGRS protocol. The protocol used by the second terminal to send the association instruction to the access terminal may be replaceable and changeable, which is not limited in this embodiment of the present disclosure.

S302: The control device sends the association instruction to an access terminal.

The access terminal may be a STB connected to a digital television having a camera function, or may be a digital television that is integrated with a set top box function and that has a camera function.

The control device sends, to the access terminal, the association instruction received from the second terminal.

The association instruction carries the URL of the preset picture of the target object and the identifier of the second terminal.

The identifier of the second terminal may be a UUID of the second terminal and an Internet Protocol address of the second terminal.

A process of sending the association instruction may be sending, by the second terminal, an association instruction packet to the access terminal using a UPnP protocol, where an instruction in the association instruction packet carries the URL of the preset picture of the target object, the UUID of the second terminal and the Internet Protocol address of the second terminal. The instruction in the association instruction packet may be defined as AVT::Set Second Screen Info( ), and the instruction AVT::Set Second Screen Info( ) carries parameters such as the URL of the preset picture of the target object, the UUID of the second terminal, and the Internet Protocol address of the second terminal. The process of sending the association instruction may also be sending a packet using another protocol, such as the DLNA protocol or the IGRS protocol. The protocol used by the second terminal to send the association instruction to the access terminal may be replaceable and changeable, which is not limited in this embodiment of the present disclosure.

S303: Create a data association table of an association relationship between a URL of a preset picture of a target object and information about the second terminal.

The access terminal creates the data association table of the association relationship between the URL of the preset picture of the target object and the information about the second terminal according to the received association instruction. A form of the association table is not limited in the present disclosure.

S304: Acquire the preset picture of the target object according to the URL of the preset picture of the target object.

That the access terminal acquires the preset picture of the target object according to the URL of the preset picture of the target object may be acquiring the preset picture of the target object according to the URL of the preset picture of the target object using an HTTP GET operation instruction in the HTTP protocol.

S305: Determine a first location relationship between the target object and a first terminal.

The determining a first location relationship between the target object and a first terminal may be acquiring the preset picture of the target object and a current picture of the target object, and comparing the acquired current picture of the target object with the acquired preset picture of the target object, to obtain the first location relationship. The first location relationship may be a degree of similarity or a ratio of overlap between the current picture and the preset picture.

A method for acquiring the preset picture of the target object may be, when the target object is using an application on the second terminal, acquiring, by the second terminal, the preset picture of the target object according to usage of the application software on the second terminal by the target object. For example, when the target object browses, using APP software on a mobile terminal such as a mobile phone, a brief introduction of a video being played on a digital television, or makes a comment on a television program being played, a mobile phone terminal turns on a human face photographing mode according to usage of the APP software, and the mobile phone terminal acquires the preset picture of the target object; or a mobile phone terminal may acquire the preset picture of the target object according to a URL of the received preset picture of the target object, which may be acquiring the preset picture of the target object according to the URL of the preset picture of the target object using an HTTP GET operation instruction in the HTTP protocol.

A method for acquiring the current picture of the target object may be acquiring, by the access terminal, the current picture of the target object through photographing; or may be obtaining, by the first terminal, the current picture of the target object through photographing, and acquiring, by the access terminal, the current picture of the target object sent by the first terminal.

For example, the acquired current picture of the target object is compared with the acquired preset picture of the target object; when a comparison result shows that a degree of similarity is less than 80%, it indicates that the first location relationship meets a first preset condition.

In another embodiment of the present disclosure, after the first location relationship between the target object and the first terminal is determined, the data association table may be queried, so as to acquire whether a UUID of the second terminal and Internet Protocol address information of the second terminal that correspond to a URL of a preset picture of the target object exist in the data association table. If the URL of the preset picture of the target object, the corresponding UUID of the second terminal, and a corresponding Internet Protocol address of the second terminal exist in the data association table, it is recorded that a state of the target object is "watching a video". If a URL of a taken picture of the target object, a corresponding UUID of the second terminal, and a corresponding Internet Protocol address of the second terminal do not exist in the data association table, the access terminal updates the data association table, creates a data association table of the URL of the preset picture of the target object, the UUID of the second terminal, and the Internet Protocol address of the second terminal, and records that a state of the target object is "watching a video".

S306: Send a detection instruction, to instruct the second terminal to detect a second location relationship between the second terminal and the target object.

When the first location relationship meets the first preset condition, the detection instruction is sent to the second terminal, where the detection instruction is used for instructing the second terminal to detect the second location relationship between the second terminal and the target object.

The detection instruction carries the UUID of the second terminal and the Internet Protocol address of the second terminal that correspond to the acquired preset picture of the target object.

A process of sending the detection instruction may be sending, by the access terminal, a detection instruction packet using a UPnP protocol, where an instruction in the detection instruction packet carries the UUID of the second terminal and the Internet Protocol address of the second terminal that correspond to the acquired preset picture of the target object. The instruction in the detection instruction packet may be defined as AVT::Set Get Device Status( ), and the instruction AVT::Set Get Device Status( ) carries parameters such as the UUID of the second terminal and the Internet Protocol address of the second terminal. The detection instruction may also be sent using another protocol, such as the DLNA protocol or the IGRS protocol. The protocol for sending the detection instruction may be replaceable and changeable, which is not limited in this embodiment of the present disclosure.

S307: The control device sends the detection instruction to the second terminal.

The control device sends, to the second terminal, the detection instruction received from the access terminal.

The detection instruction carries the UUID of the second terminal and the Internet Protocol address of the second terminal that correspond to the preset of the target object.

A process of sending the detection instruction may be sending, by the control device, a detection instruction packet to the second terminal using a UPnP protocol, where an instruction in the detection instruction packet carries the UUID of the second terminal and the Internet Protocol address of the second terminal that correspond to the acquired preset picture of the target object. The instruction in the detection instruction packet may be defined as AVT::Set Get Device Status( ), and the instruction AVT::Set Get Device Status( ) carries parameters such as the UUID of the second terminal and the Internet Protocol address of the second terminal. The detection instruction may also be sent using another protocol, such as the DLNA protocol or the Intelligent Grouping and Resource Sharing (IGRS) protocol. The protocol for sending the detection instruction may be replaceable and changeable, which is not limited in this embodiment of the present disclosure.

S308: The second terminal detects the second location relationship between the second terminal and the target object.

In this embodiment of the present disclosure, that the second terminal detects the second location relationship between the second terminal and the target object may be the second terminal acquires a picture according to a camera, compares the acquired picture with the preset picture of the target object, and detects that a location relationship between the second terminal and the target object meets a second preset condition; or may be the second terminal detects, according to a pressure sensor, that a location relationship between the second terminal and the target object meets a second preset condition, and determines whether the target object is holding the second terminal; or may be the second terminal detects, according to a gravity sensor, that a location relationship between the second terminal and the target object meets a second preset condition, and determines whether the target object is moving with the second terminal held.

S309: Send a switching instruction to the control device, where the switching instruction is sent when the second terminal determines that the second location relationship between the second terminal and the target object meets a second preset condition.

The switching instruction includes instructing to perform capability negotiation according to a media capability of the access terminal and a media capability of the second terminal.

The switching instruction carries a Universal Plug and Play protocol.

The Universal Plug and Play protocol packet includes a capability negotiation packet and a communication connection packet.

That the second terminal sends a switching instruction to the control device may be, when determining that the second location relationship between the second terminal and the target object meets the second preset condition, the second terminal sends the switching instruction to the control device.

The second preset condition may be set by the target object when the target object is using an APP related to a second screen of the second terminal. For example, the second preset condition may be set as 0 m to 1 m.

In this embodiment of the present disclosure, that the second terminal determines that the second location relationship between the second terminal and the target object meets the second preset condition may be determining, by the second terminal, that the target object is using an APP related to a second screen of the second terminal; and if the target object is using a second screen function and the second screen function is running in a foreground, sending, by the second terminal, the switching instruction.

The second terminal includes an electronic device that can be used for interaction and communication on content of a television program during television watching, for example, a tablet computer or a smartphone. For a program, a movie, music, a video game, or the like on a television, synchronous display of related content may also be provided on a portable device.

In another embodiment of the present disclosure, that the second terminal determines that the second location relationship between the second terminal and the target object meets the second preset condition may be querying, by the second terminal, the target object whether to perform switching, confirming, by the target object, whether to perform switching, and if the target object determines to perform switching of media information, sending, by the second terminal, the switching instruction.

S310: Perform capability negotiation according to a media capability of the access terminal and a media capability of the second terminal.

That the control device receives the switching instruction, and performs capability negotiation according to the media capability of the access terminal and the media capability of the second terminal is the control device receives the switching instruction sent by the second terminal, establishes a communication connection, performs capability negotiation according to the media capability of the access terminal and the media capability of the second terminal, and acquires the media capability of the second terminal.

In this embodiment of the present disclosure, media information currently played on the first terminal is on-demand media information, and the control device sends the switching instruction to the access terminal, to instruct to acquire a playback capability of the access terminal and to establish a communication connection with the second terminal.

The media information may be video information.

The media information may be from a home network, a media server on a network side, or the like.

The switching instruction carries a Universal Plug and Play protocol.

The Universal Plug and Play protocol packet includes a capability negotiation packet and a communication connection packet.

A process of sending the switching instruction may be sending, by the control device, a capability negotiation packet to the access terminal, to instruct to acquire the playback capability of the access terminal, and to instruct to perform capability negotiation on the access terminal and the second terminal, where a purpose of the capability negotiation may be determining whether the second terminal has a capability of playing the on-demand media information. After the access terminal and the second terminal determine a capability negotiation capability, the control device sends a communication connection packet to the access terminal, and the control device establishes a communication connection between the access terminal and the second terminal according to the sent communication connection packet. The control device sends an instruction packet to the access terminal using a UPnP protocol, where an instruction in the instruction packet may be defined as AVT::Get Position Info( ), and acquires a URL of the media information currently played on the first terminal and a playback time point of the media information currently played.

In another embodiment of the present disclosure, media information currently played on the first terminal is live media information, and the control device sends the switching instruction to the access terminal, to instruct to acquire a playback capability of the access terminal and to establish a communication connection with the second terminal.

The switching instruction carries a Universal Plug and Play protocol.

The Universal Plug and Play protocol packet includes a capability negotiation packet and a communication connection packet.

A process of sending the switching instruction may be sending, by the control device, a capability negotiation packet to the access terminal, to instruct to acquire of the playback capability of the access terminal, and to instruct to perform capability negotiation on the access terminal and the second terminal, where a purpose of the capability negotiation may be determining a coding scheme in which the access terminal and the second terminal play the live media information. After the access terminal and the second terminal determine a capability negotiation capability, the control device sends a communication connection packet to the access terminal, and the control device establishes a communication connection between the access terminal and the second terminal according to the sent communication connection packet. A media information data stream of the media information currently played on the first terminal is converted into a media information data stream for playback on the second terminal, and the converted media information data stream is sent to the second terminal.

S311: The access terminal sends media information currently played on the first terminal to the control device.

In another embodiment of the present disclosure, the media information currently played on the first terminal is live media information, a media information data stream of the media information currently played on the first terminal is converted into a media information data stream for playback on the second terminal, and the converted media information data stream is sent to the second terminal.

S312: The control device sends the media information to the second terminal.

In this embodiment of the present disclosure, the media information currently played on the first terminal is on-demand media information, and the control device sends, to the second terminal, a URL of the current on-demand media information received from the access terminal and a playback time point of the current on-demand media information.

In another embodiment of the present disclosure, the media information currently played on the first terminal is live media information, a media information data stream of the media information currently played on the first terminal is converted into a media information data stream for playback on the second terminal, and the converted media information data stream is sent to the second terminal.

S313: The second terminal plays the media information.

When the media information played on the first terminal is on-demand media information, the second terminal plays the media information according to the acquired URL of the media information currently played and the acquired playback time point of the media information currently played.

The playing the media information may be acquiring, by the second terminal, according to the acquired URL of the media information currently played on the first terminal and using an HTTP GET operation instruction in the HTTP protocol, the media information currently played from a media server or a device integrated with a media server function, and playing the media information.

When the media information played on the first terminal is live media information, a media information data stream of the media information currently played on the first terminal is converted into a media information data stream for playback on the second terminal, and the converted media information data stream is sent to the second terminal. The second terminal receives the converted media information data stream, and plays the media information.

In this embodiment of the media playback method of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 4:
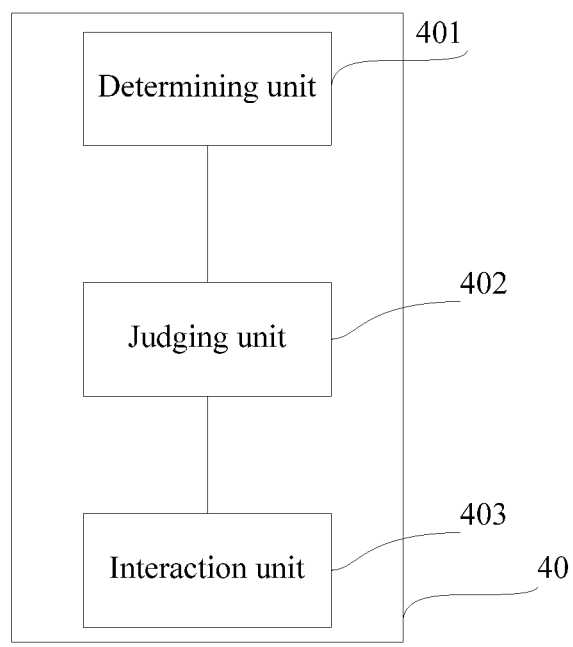
FIG. 4 is a schematic structural diagram of a media playback access apparatus 40 according to an embodiment of the present disclosure.

FIG. 4 is a schematic structural diagram of a media playback access apparatus 40 according to an embodiment of the present disclosure. As shown in FIG. 4, the apparatus 40 includes a determining unit 401, a judging unit 402, and an interaction unit 403.

The determining unit 401 is configured to determine a first location relationship between a target object and a first terminal, and determine a second location relationship between a second terminal and the target object.

The judging unit 402 is configured to determine that the first location relationship meets a first preset condition, and determine that the second location relationship meets a second preset condition.

The interaction unit 403 is configured to, when the second location relationship meets the second preset condition, send media information currently played on the first terminal to the second terminal, to enable the second terminal to play the media information.

Figure 5:
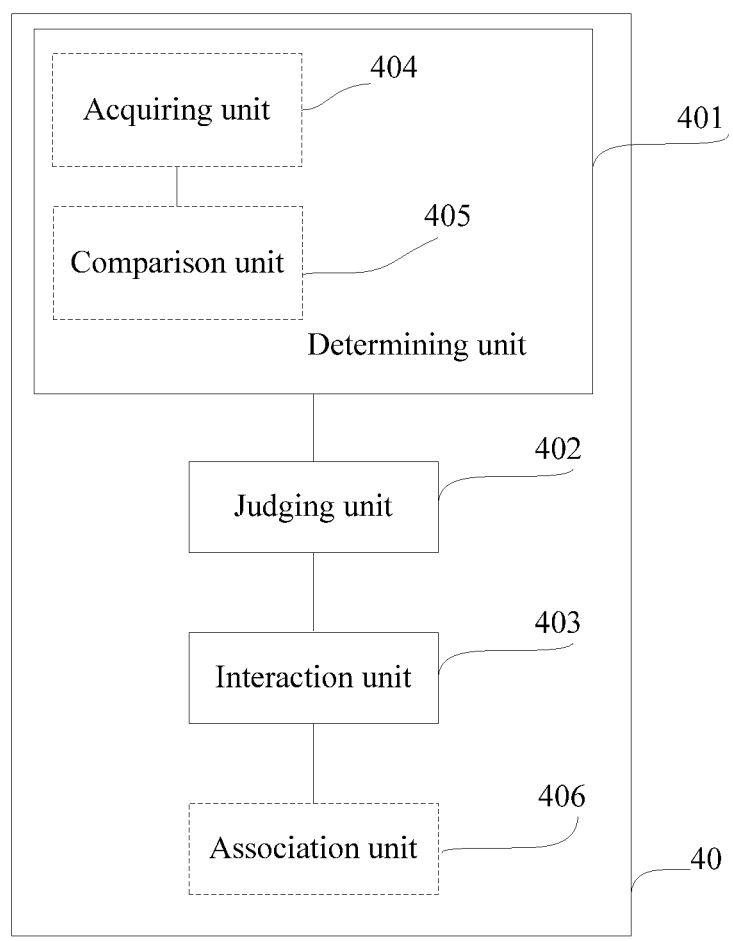
FIG. 5 is a schematic structural diagram of the media playback access apparatus 40 according to another embodiment of the present disclosure.

FIG. 5 is a schematic structural diagram of the media playback access apparatus 40 according to another embodiment of the present disclosure. As shown in FIG. 5, the determining unit 401 further includes an acquiring unit 404 and a comparison unit 405.

The acquiring unit 404 is configured to acquire a preset picture of the target object and a current picture of the target object.

The comparison unit 405 is configured to compare the acquired current picture of the target object with the acquired preset picture of the target object, to obtain the first location relationship.

In another embodiment of the present disclosure, the apparatus 40 further includes an association unit 406. The interaction unit 403 is further configured to receive an association instruction, where the association instruction carries a preset identifier of the target object and an identifier of the second terminal, and the association instruction is used for associating the preset identifier of the target object with the identifier of the second terminal.

The association unit 406 is configured to determine an association relationship between the preset identifier of the target object and the identifier of the second terminal according to the preset identifier of the target object.

The interaction unit 403 is further configured to, when the second location relationship meets the second preset condition, acquire, according to the association relationship between the preset identifier of the target object and the identifier of the second terminal, the identifier, of the second terminal, corresponding to the preset identifier of the target object, and send the media information currently played on the first terminal to the second terminal according to the identifier of the second terminal.

In this embodiment of the media playback access apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 6:
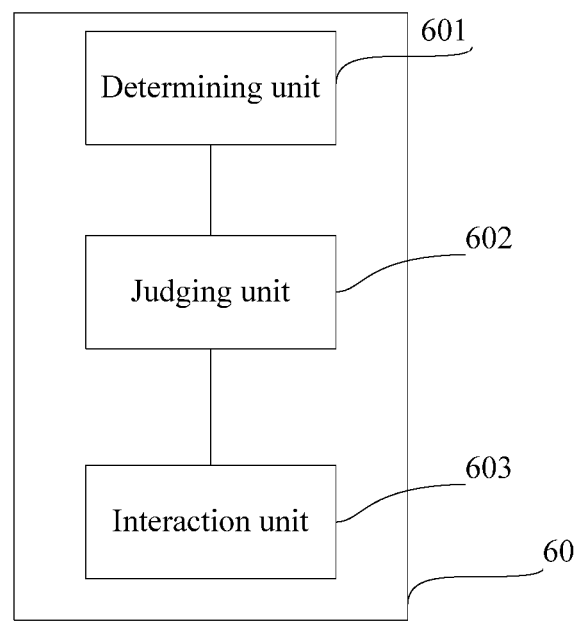
FIG. 6 is a schematic structural diagram of a media playback access apparatus 60 according to another embodiment of the present disclosure.

FIG. 6 is a schematic structural diagram of a media playback access apparatus 60 according to another embodiment of the present disclosure. As shown in FIG. 6, the apparatus 60 includes a determining unit 601, a judging unit 602, and an interaction unit 603.

The determining unit 601 is configured to determine a first location relationship between a target object and a first terminal.

The judging unit 602 is configured to determine that the first location relationship meets a first preset condition.

The interaction unit 603 is configured to, when the first location relationship meets the first preset condition, send a detection instruction to a second terminal, where the detection instruction is used for instructing the second terminal to detect a second location relationship between the second terminal and the target object; and is configured to receive a switching instruction, where the switching instruction is sent when the second terminal determines that the second location relationship between the second terminal and the target object meets a second preset condition, and send media information currently played on the first terminal to the second terminal according to the switching instruction.

Figure 7:
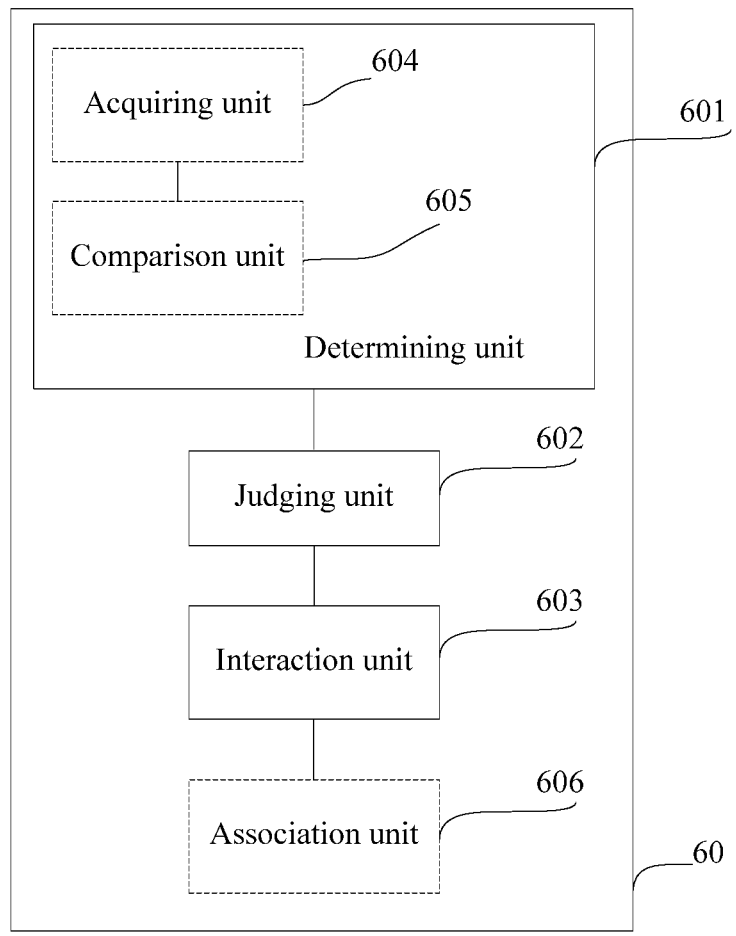
FIG. 7 is a schematic structural diagram of the media playback access apparatus 60 according to another embodiment of the present disclosure.

FIG. 7 is a schematic structural diagram of the media playback access apparatus 60 according to another embodiment of the present disclosure. As shown in FIG. 7, the determining unit 601 further includes an acquiring unit 604 and a comparison unit 605.

The acquiring unit 604 is configured to acquire a preset picture of the target object and a current picture of the target object.

The comparison unit 605 is configured to compare the acquired current picture of the target object with the acquired preset picture of the target object, to obtain the first location relationship.

In another embodiment of the present disclosure, the apparatus 60 further includes an association unit 606.

The interaction unit 603 is further configured to receive an association instruction, where the association instruction carries a preset identifier of the target object and an identifier of the second terminal, and the association instruction is used for associating the preset identifier of the target object with the identifier of the second terminal.

The association unit 606 is configured to determine an association relationship between the preset identifier of the target object and the identifier of the second terminal according to the preset identifier of the target object.

In another embodiment of the present disclosure, the interaction unit 603 is further configured to acquire, according to the association relationship between the preset identifier of the target object and the identifier of the second terminal, the identifier, of the second terminal, corresponding to the preset identifier of the target object.

In this embodiment of the media playback access apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 8:
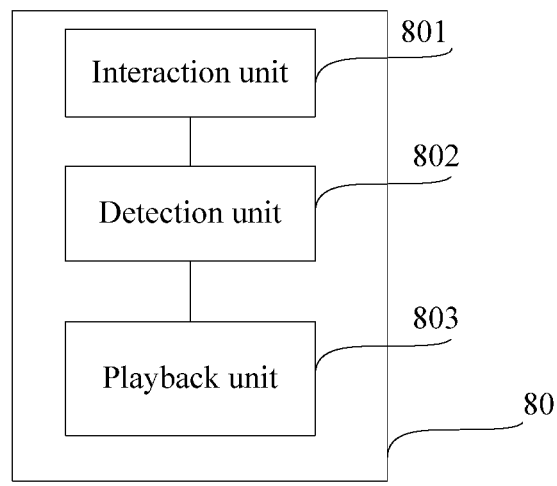
FIG. 8 is a schematic structural diagram of a media playback apparatus 80 according to an embodiment of the present disclosure.

FIG. 8 is a schematic structural diagram of a media playback apparatus 80 according to an embodiment of the present disclosure. As shown in FIG. 8, the apparatus 80 further includes an interaction unit 801, a detection unit 802, and a playback unit 803.

The interaction unit 801 is configured to receive a detection instruction sent by an access terminal, where the detection instruction is sent by the access terminal to a second terminal when a first location relationship between a target object and a first terminal meets a first preset condition; when the second terminal determines that a second location relationship between the second terminal and the target object meets a second preset condition, send a switching instruction to the access terminal, where the switching instruction is used for sending media information currently played on the first terminal to the second terminal for playback; and receive the media information currently played on the first terminal.

The detection unit 802 is configured to detect the second location relationship between the second terminal and the target object according to the detection instruction.

The playback unit 803 is configured to play the media information currently played on the first terminal.

In another embodiment of the present disclosure, the interaction unit 801 is further configured to send an association instruction, where the association instruction carries a preset identifier of the target object and an identifier of the second terminal, and the association instruction is used for associating the preset identifier of the target object with the identifier of the second terminal.

In another embodiment of the present disclosure, the detection unit 802 is further configured to detect an image signal, and obtain the second location relationship between the second terminal and the target object; or the detection unit 802 is further configured to detect pressure information, and obtain the second location relationship between the second terminal and the target object; or the detection unit 802 is further configured to detect gravity information, and obtain the second location relationship between the second terminal and the target object.

In this embodiment of the media playback apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 9:
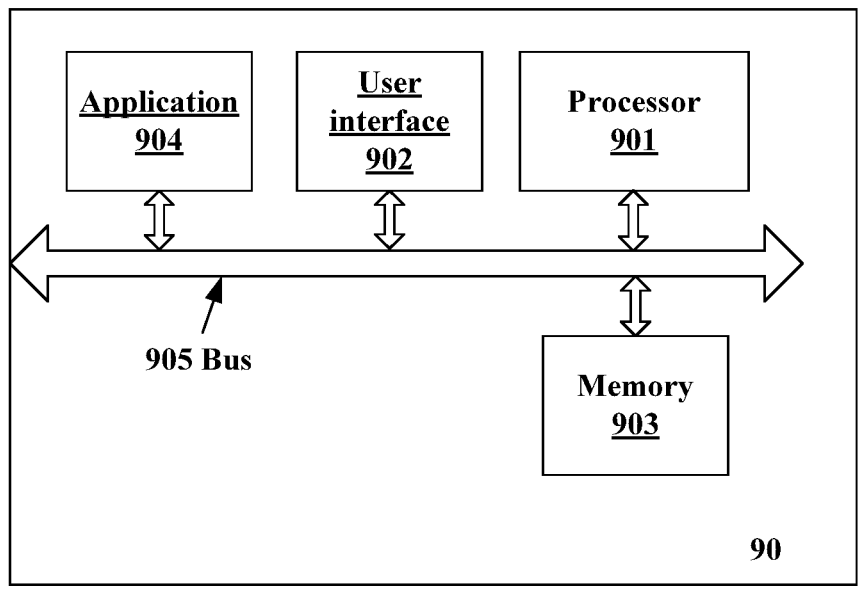
FIG. 9 is a schematic diagram of a media playback access apparatus 90 according to an embodiment of the present disclosure.

FIG. 9 is a schematic diagram of a media playback access apparatus 90 according to an embodiment of the present disclosure. As shown in FIG. 9, the apparatus 90 includes a processor 901, a user interface 902, a memory 903, an application 904, and a bus 905.

The processor 901 is configured to execute a program, in this embodiment of the present disclosure, stored in the memory 903, and perform bidirectional communication with another apparatus using the bus.

The user interface 902 is open to a user, and is configured to connect terminals and perform data exchange.

The memory 903 may include one or more of a floppy disk, a USB flash drive, a mobile hard drive, a read-only memory (ROM), a random access memory (RAM), a magnetic disk, an optical disc, and the like of a computer, and is configured to store the program that can execute this embodiment of the present disclosure or an application database in this embodiment of the present disclosure. By using the bus 905, the memory 903 receives input from another component or information stored in the memory 903 is invoked by another component. The input is, for example, an instruction for querying a text information identifier, to query a media information identifier, a text content identifier, and a keyword identifier.

The application 904 includes various system programs, and is configured to implement various application services.

The processor 901 and the memory 903 may also be integrated into a physical module to which this embodiment of the present disclosure is applied, and the program for implementing this embodiment of the present disclosure is stored and runs on the physical module.

Components of the apparatus 90 are coupled using the bus 905, where the bus 905 includes a data bus, and may further include a power bus, a control bus, a state signal bus, and the like. However, for clear description, various buses in the figure are all marked as the bus 905.

In this embodiment of the present disclosure, the units of the apparatus 90 separately execute the following content.

The processor 901 may be configured to determine a first location relationship between a target object and a first terminal; determine that the first location relationship meets a first preset condition; and when the first location relationship meets the first preset condition, send a detection instruction to a second terminal, where the detection instruction is used for instructing the second terminal to detect a second location relationship between the second terminal and the target object; and configured to receive a switching instruction, where the switching instruction is sent when the second terminal determines that the second location relationship between the second terminal and the target object meets a second preset condition, and send media information currently played on the first terminal to the second terminal according to the switching instruction.

In another embodiment of the present disclosure, the processor 901 may be further configured to create, according to a uniform resource locator of a preset picture of the target object, a data association table of an association relationship between the uniform resource locator of the preset picture of the target object and information about the second terminal.

In another embodiment of the present disclosure, the processor 901 may be further configured to compare information about an acquired current picture of the target object with information about the acquired preset picture of the target object, to obtain the first location relationship.

In another embodiment of the present disclosure, the processor 901 may be further configured to, before sending the detection instruction to the second terminal, query the data association table, and acquire the information, about the second terminal, corresponding to the uniform resource locator of the preset picture of the target object.

The user interface 902 may be configured to perform data exchange, and may be configured to perform, with another connected device according to content executed by the processor 901, instruction transfer, content receiving and sending, or the like, for example, send the detection instruction to the second terminal, receive the switching instruction, or send the media information currently played on the first terminal to the second terminal.

In another embodiment of the present disclosure, the user interface 902 may be further configured to acquire, according to the received uniform resource locator of the preset picture of the target object, the preset picture of the target object, and configured to acquire the current picture of the target object.

The memory 903 may be configured to query and store an instruction or content that needs to be used in a process of executing an operation by the processor 901; or may be configured to query and store an instruction transferred, content received and sent, or the like between the memory 903 and another connected device in a process of executing an operation by the user interface 902; or may store a preset identifier of the target object, and determine an association relationship between the preset identifier of the target object and an identifier of the second terminal.

In this embodiment of the media playback access apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 10:
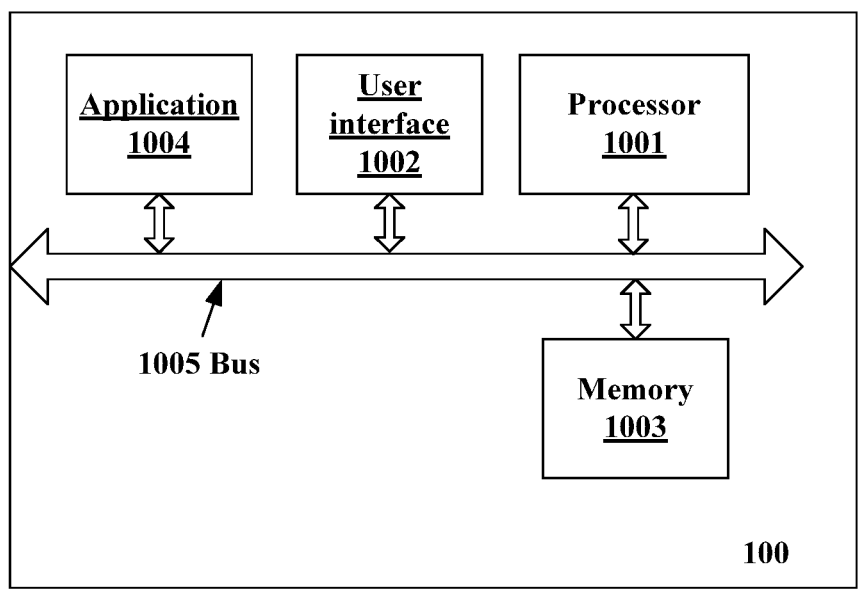
FIG. 10 is a schematic diagram of a media playback access apparatus 100 according to an embodiment of the present disclosure.

FIG. 10 is a schematic diagram of a media playback access apparatus 100 according to an embodiment of the present disclosure. As shown in FIG. 10, the apparatus 100 includes a processor 1001, a user interface 1002, a memory 1003, an application 1004, and a bus 1005.

The processor 1001 is configured to execute a program, in this embodiment of the present disclosure, stored in the memory 1003, and perform bidirectional communication with another apparatus using the bus.

The user interface 1002 is open to a user, and is configured to connect terminals and perform data exchange.

The memory 1003 may include one or more of a floppy disk, a USB flash drive, a mobile hard drive, a ROM, a random access memory (RAM), a magnetic disk, an optical disc, and the like of a computer, and is configured to store the program that can execute this embodiment of the present disclosure or an application database in this embodiment of the present disclosure. By using the bus 1005, the memory 1003 receives input from another component or information stored in the memory 1003 is invoked by another component. The input is, for example, an instruction for querying a text information identifier, to query a media information identifier, a text content identifier, and a keyword identifier.

The application 1004 includes various system programs, and is configured to implement various application services.

The processor 1001 and the memory 1003 may also be integrated into a physical module to which this embodiment of the present disclosure is applied, and the program for implementing this embodiment of the present disclosure is stored and runs on the physical module.

Components of the apparatus 100 are coupled using the bus 1005. The bus 1005 includes a data bus, and may further include a power bus, a control bus, a state signal bus, and the like. However, for clear description, various buses in the figure are all marked as the bus 1005.

In this embodiment of the present disclosure, the units of the apparatus 100 separately execute the following content.

The processor 1001 may be configured to determine a first location relationship between a target object and a first terminal; determine that the first location relationship meets a first preset condition; when the first location relationship meets the first preset condition, determine a second location relationship between a second terminal and the target object; and when the second location relationship meets a second preset condition, send media information currently played on the first terminal to the second terminal, to enable the second terminal to play the media information.

In another embodiment of the present disclosure, the processor 1001 may be further configured to determine, according to a preset identifier of the target object, an association relationship between the preset identifier of the target object and an identifier of the second terminal.

In another embodiment of the present disclosure, the processor 1001 may be further configured to acquire a preset picture of the target object and a current picture of the target object, and compare the acquired current picture of the target object with the acquired preset picture of the target object, to obtain the first location relationship.

In another embodiment of the present disclosure, the processor 1001 may be further configured to, before determining the second location relationship between the second terminal and the target object, acquire, according to the association relationship between the preset identifier of the target object and the identifier of the second terminal, the identifier, of the second terminal, corresponding to the preset identifier of the target object.

The user interface 1002 may be configured to perform data exchange, and may be configured to perform, with another connected device according to content executed by the processor 1001, instruction transfer, content receiving and transmitting, or the like, for example, send a detection instruction to the second terminal, receive the switching instruction, or send the media information currently played on the first terminal to the second terminal.

In another embodiment of the present disclosure, the user interface 1002 may be further configured to acquire, according to a received uniform resource locator of the preset picture of the target object, the preset picture of the target object, and configured to acquire the current picture of the target object.

The memory 1003 may be configured to query and store an instruction or content that needs to be used in a process of executing an operation by the processor 1001; or may be configured to query and store an instruction transferred, content received and sent, or the like between the memory 1003 and another connected device in a process of executing an operation by the user interface 1002; or may store a preset identifier of the target object, and determine an association relationship between the preset identifier of the target object and the identifier of the second terminal.

In this embodiment of the media playback access apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 11:
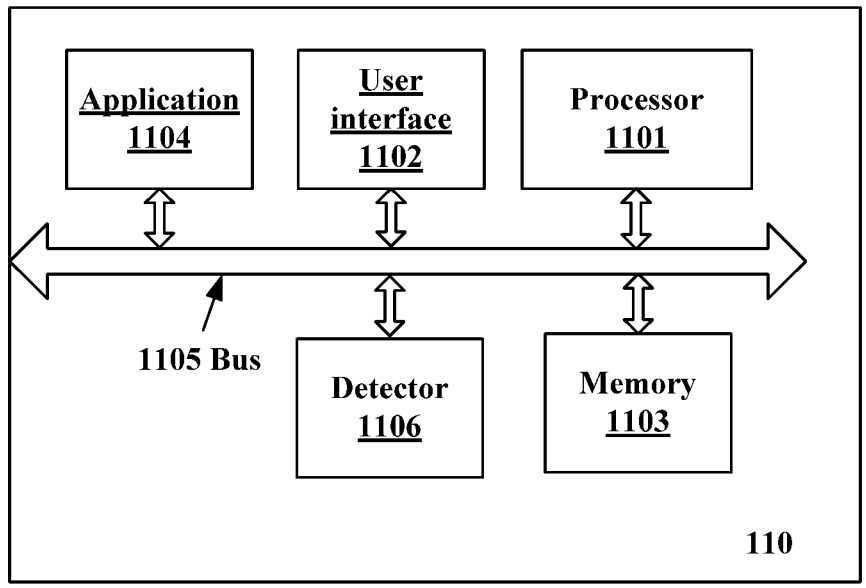
FIG. 11 is a schematic diagram of a media playback apparatus 110 according to an embodiment of the present disclosure.

FIG. 11 is a schematic diagram of a media playback apparatus 110 according to an embodiment of the present disclosure. As shown in FIG. 11, the apparatus 110 includes a processor 1101, a user interface 1102, a memory 1103, an application 1104, a bus 1105, and a detector 1106.

The processor 1101 is configured to execute a program, in this embodiment of the present disclosure, stored in the memory 1103, and perform bidirectional communication with another apparatus using the bus.

The user interface 1102 is open to a user, and is configured to connect terminals and perform data exchange.

The memory 1103 may include one or more of a floppy disk, a USB flash drive, a mobile hard drive, a ROM, a RAM, a magnetic disk, an optical disc, and the like of a computer, and is configured to store the program that can execute this embodiment of the present disclosure or an application database in this embodiment of the present disclosure. By using the bus 1105, the memory 1103 receives input from another component or information stored in the memory 1103 is invoked by another component. The input is, for example, an instruction for querying a text information identifier, to query a media information identifier, a text content identifier, and a keyword identifier.

The application 1104 includes various system programs, and is configured to implement various application services.

The processor 1101 and the memory 1103 may also be integrated into a physical module to which this embodiment of the present disclosure is applied, and the program for implementing this embodiment of the present disclosure is stored and runs on the physical module.

Components of the apparatus 110 are coupled using the bus 1105. The bus 1105 includes a data bus, and may further include a power bus, a control bus, a state signal bus, and the like. However, for clear description, various buses in the figure are all marked as the bus 1105.

In this embodiment of the present disclosure, the units of the apparatus 110 separately execute the following content.

The detector 1106 may be configured to detect a second location relationship between a second terminal and a target object according to a detection instruction, and may be configured to detect an image signal, and obtain the second location relationship between the second terminal and the target object; or detect pressure information, and obtain the second location relationship between the second terminal and the target object; or detect gravity information, and obtain the second location relationship between the second terminal and the target object.

In this embodiment of the present disclosure, the detector 1106 may be a camera, a pressure sensor, or a gravity sensor.

The user interface 1102 may be configured to receive the detection instruction sent by an access terminal, where the detection instruction is sent by the access terminal to the second terminal when a first location relationship between the target object and a first terminal meets a first preset condition, when the second terminal determines that the second location relationship between the second terminal and the target object meets a second preset condition, send a switching instruction to the access terminal, where the switching instruction is used for sending media information currently played on the first terminal to the second terminal for playback, and receive the media information currently played on the first terminal.

In another embodiment of the present disclosure, the user interface 1102 may be further configured to send an association instruction, where the association instruction carries a uniform resource locator of the preset picture of the target object and information about the second terminal, where the association instruction is used for associating the uniform resource locator of the preset picture of the target object and the information about the second terminal.

The memory 1103 may be configured to query and store an instruction or content that needs to be used in a process of executing an operation by the processor 1101; or may be configured to query and store an instruction transferred, content received and sent, or the like between the memory 1103 and another connected device in a process of executing an operation by the user interface 1102; or may store a preset identifier of the target object, and determine an association relationship between the preset identifier of the target object and the identifier of the second terminal.

In this embodiment of the media playback apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 12:
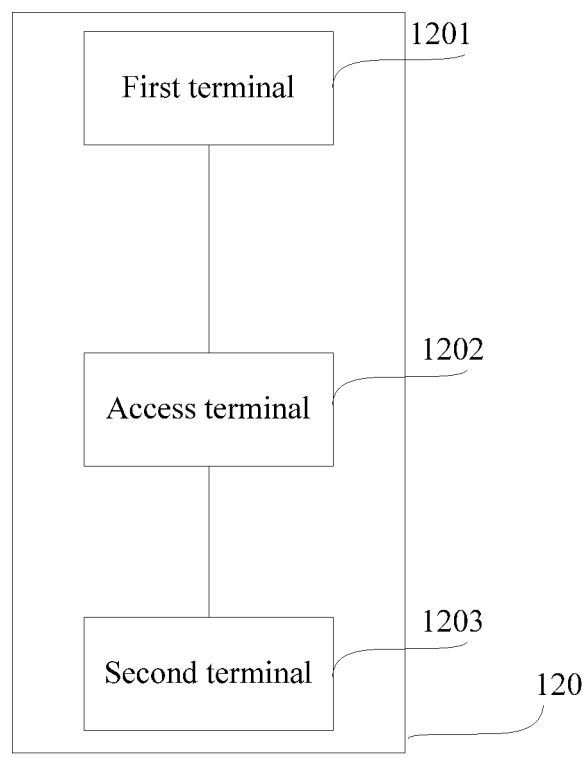
FIG. 12 is a schematic block diagram of a media playback system 120 according to an embodiment of the present disclosure.

FIG. 12 is a schematic block diagram of a media playback system 120 according to an embodiment of the present disclosure. As shown in FIG. 12, the system 120 includes a first terminal 1201, an access terminal 1202, and a second terminal 1203.

The access terminal 1202 is configured to determine a first location relationship between a target object and the first terminal 1201; when the first location relationship meets a first preset condition, determine a second location relationship between the second terminal and the target object; and when the second location relationship meets a second preset condition, send media information currently played on the first terminal to the second terminal, to enable the second terminal to play the media information.

The second terminal 1203 is configured to receive the media information currently played on the first terminal 1201, and play the media information.

In another embodiment of the present disclosure, that the access terminal 1202 determines a first location relationship between a target object and the first terminal is acquiring a preset picture of the target object and a current picture of the target object, and comparing the acquired current picture of the target object with the acquired preset picture of the target object, to obtain the first location relationship.

Before determining the first location relationship between the target object and the first terminal, the access terminal 1202 is further configured to receive an association instruction, where the association instruction carries a preset identifier of the target object and an identifier of the second terminal, and the association instruction is used for associating the preset identifier of the target object with the identifier of the second terminal; and determine an association relationship between the preset identifier of the target object and the identifier of the second terminal according to the preset identifier of the target object.

The access terminal 1202 is further configured to, before the second location relationship between the second terminal and the target object is determined, acquire, according to the association relationship between the preset identifier of the target object and the identifier of the second terminal, the identifier of the second terminal, corresponding to the preset identifier of the target object.

In this embodiment of the media playback apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

Figure 13:
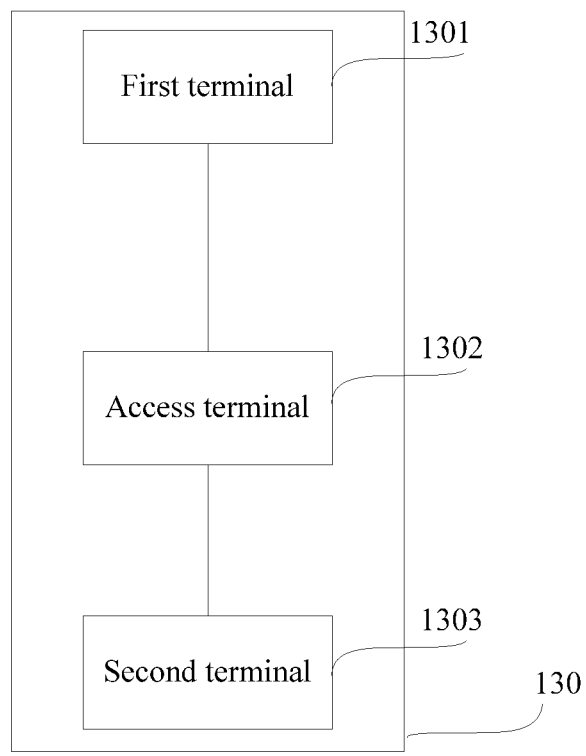
FIG. 13 is a schematic block diagram of a media playback system 130 according to an embodiment of the present disclosure.

FIG. 13 is a schematic block diagram of a media playback system 130 according to an embodiment of the present disclosure. As shown in FIG. 13, the system 130 includes a first terminal 1301, an access terminal 1302, and a second terminal 1303.

The access terminal 1302 is configured to determine a first location relationship between a target object and the first terminal 1301; when the first location relationship meets a first preset condition, send a detection instruction to the second terminal 1303, where the detection instruction is used for instructing the second terminal 1303 to detect a second location relationship between the second terminal 1303 and the target object; receive a switching instruction, where the switching instruction is sent when the second terminal 1303 determines that the second location relationship between the second terminal 1303 and the target object meets a second preset condition; and send media information currently played on the first terminal 1301 to the second terminal 1303 according to the received switching instruction, to enable the second terminal 1303 to play the media information.

The second terminal 1303 is configured to receive the detection instruction sent by the access terminal 1302, where the detection instruction is sent by the access terminal 1302 to the second terminal 1303 when the first location relationship between the target object and the first terminal 1301 meets the first preset condition; detect the second location relationship between the second terminal 1303 and the target object; when the second terminal 1303 determines that the second location relationship between the second terminal 1303 and the target object meets the second preset condition, send the switching instruction to the access terminal 1302, where the switching instruction is used for sending the media information currently played on the first terminal 1301 to the second terminal 1303 for playback; receive the media information currently played on the first terminal 1301, and play the media information.

In another embodiment of the present disclosure, before the access terminal 1302 determines the first location relationship between the target object and the first terminal 1301, the access terminal 1302 is further configured to receive an association instruction, where the association instruction carries a uniform resource locator of a preset picture of the target object and information about the second terminal.

In another embodiment of the present disclosure, the access terminal 1302 is further configured to create, according to the uniform resource locator of the preset picture of the target object, a data association table of an association relationship between the uniform resource locator of the preset picture of the target object and the information about the second terminal.

In another embodiment of the present disclosure, the access terminal 1302 is further configured to acquire, according to the received uniform resource locator of the preset picture of the target object, the preset picture of the target object; and acquire a current picture of the target object, and compare information of the acquired current picture of the target object with information of the acquired preset picture of the target object, to obtain the first location relationship.

In another embodiment of the present disclosure, that the second terminal 1303 detects the second location relationship between the second terminal 1303 and the target object is the second terminal 1303 obtains the second location relationship between the second terminal 1303 and the target object according to an image signal detected by a camera; or the second terminal 1303 obtains a location relationship between the second terminal 1303 and the target object according to a pressure signal detected by a pressure sensor; or the second terminal 1303 obtains a location relationship between the second terminal 1303 and the target object according to a gravity signal detected by a gravity sensor.

In another embodiment of the present disclosure, the access terminal 1302 is further configured to, before sending the detection instruction to the second terminal 1303, query the data association table, to acquire the information, about the second terminal 1303, corresponding to the uniform resource locator of the preset picture of the target object.

In this embodiment of the media playback apparatus of the present disclosure, a location relationship between a target object and a first terminal and a location relationship between the target object and a second terminal are determined, and media information currently played on the first terminal is sent to the second terminal, to enable the second terminal to play the media information. Playback of media information among multiple screens is performed in the foregoing manner, so as to implement seamless playback of media information, thereby providing personalized data services and applications to a user, and improving efficiency of acquiring media information by a user. Desirable user experience is brought to a user, and practicability is high.

A person of ordinary skill in the art may be aware that, in combination with the examples described in the embodiments disclosed in this specification, units, algorithms, and method steps may be implemented by a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing server and unit, reference may be made to a corresponding process in the foregoing method embodiments, and details are not described herein again.

In the several embodiments provided in the present application, the disclosed server and method may be implemented in other manners. For example, the described server embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A media playback method, comprising:
    receiving, by an access terminal integrated into a first terminal, an association instruction from a second terminal, wherein the association instruction carries a preset identifier of a target object and an identifier of the second terminal, wherein the association instruction is used for associating the preset identifier of the target object with the identifier of the second terminal;
    determining, by the access terminal, an association relationship between the preset identifier of the target object and the identifier of the second terminal according to the preset identifier of the target object;
    acquiring, by the access terminal using a camera of the first terminal, a current picture of the target object;
    acquiring a preset picture of the target object using a uniform resource locator (URL) of the acquired preset picture, wherein the URL of the acquired preset picture is included in the association instruction from the second terminal;
    performing, by the access terminal, facial recognition using the acquired current picture of the target object and the acquired preset picture of the target object in order to obtain a first location relationship between the target object and the first terminal, wherein performing the facial recognition includes comparing the acquired current picture of the target object with the acquired preset picture of the target object;
    determining, by the access terminal using the camera of the first terminal and when the first location relationship meets a first preset condition, a second location relationship between the second terminal and the target object;
    performing, by the access terminal, capability negotiation according to a media capability of the first terminal and a media capability of the second terminal in order to determine whether the second terminal is capable of playing media information; and
    sending, by the access terminal when the second location relationship meets a second preset condition and the second terminal is capable of playing the media information, the media information currently played on the first terminal to the second terminal, to enable the second terminal to play the media information.

2. The method according to claim 1, wherein when the second location relationship between the second terminal and the target object meets the second preset condition, the method further comprises receiving a switching instruction, wherein the switching instruction is sent when the second terminal determines that the second location relationship between the second terminal and the target object meets the second preset condition, and wherein sending media information currently played on the first terminal to the second terminal comprises sending, according to the received switching instruction, the media information currently played on the first terminal to the second terminal.

3. The method according to claim 1, wherein before determining the second location relationship between the second terminal and the target object, the method further comprises acquiring, according to the association relationship between the preset identifier of the target object and the identifier of the second terminal, the identifier, of the second terminal, corresponding to the preset identifier of the target object.

4. A media playback method, comprising:
    sending, by a second terminal, an association instruction to an access terminal, wherein the association instruction carries a preset identifier of a target object and an identifier of a second terminal, wherein the association instruction is used for associating the preset identifier of the target object with the identifier of the second terminal, and wherein the preset identifier of the target object includes a uniform resource locator (URL) of a preset picture of the target object;
    receiving, by the second terminal, a detection instruction sent by the access terminal, wherein the detection instruction is sent when a first location relationship between a target object and a first terminal meets a first preset condition;
    detecting, using the preset picture, a second location relationship between the second terminal and the target object;

sending, when the second terminal determines that the second location relationship between the second terminal and the target object meets a second preset condition, a switching instruction to the access terminal, wherein the switching instruction is used for instructing to send media information currently played on the first terminal to the second terminal for playback, wherein the access terminal performs capability negotiation according to a media capability of the first terminal and a media capability of the second terminal in order to determine whether the second terminal is capable of playing the media information;

receiving the media information currently played on the first terminal when the second terminal is capable of playing the media information; and playing the media information.

5. A media playback access apparatus, co p sing:

a memory storing executable instructions; and a processor coupled to the memory and configured to:
  receive an association instruction from a second terminal, wherein the association instruction carries a preset identifier of a target object and an identifier of the second terminal, wherein the association instruction is used for associating the preset identifier of the target object with the identifier of the second terminal, and wherein the preset identifier of the target object includes a uniform resource locator (URL) of a preset picture of the target object;
  determine an association relationship between the preset identifier of the target object and the identifier of the second terminal according to the preset identifier of the target object;
  determine, using the preset picture, a first location relationship between a target object and a first terminal;
  determine a second location relationship between a second terminal and the target object;
  determine that the first location relationship meets a first preset condition;
  determine that the second location relationship meets a second preset condition;
  perform capability negotiation according to a media capability of the first terminal and a media capability of the second terminal in order to determine whether the second terminal is capable of playing media information; and
  send, when the second location relationship meets the second preset condition and the second terminal is capable of playing the media information, the media information currently played on the first terminal to the second terminal, to enable the second terminal to play the media information.

6. The apparatus according to claim 5, wherein the media playback access apparatus further comprises a gravity sensor, and wherein the processor is configured to determine the second location relationship between the second terminal and the target object according to a gravity signal detected by the gravity sensor.

7. The apparatus according to claim 5, wherein the processor is further configured to:
  acquire the preset picture of the target object and a current picture of the target object; and
  compare the acquired current picture of the target object with the preset picture of the target object in order to obtain the first location relationship.

8. The apparatus according to claim 5, wherein the processor is further configured to acquire, according to the association relationship between the preset identifier of the target object and the identifier of the second terminal, the identifier, of the second terminal, corresponding to the preset identifier of the target object.

9. The apparatus according to claim 5, wherein the processor is further configured to receive a capability negotiation packet from the second terminal, and wherein the capability negotiation packet causes the processor to initiate performing capability negotiation.

10. The apparatus according to claim 9, wherein the processor is further configured to determine a coding scheme to enable the second terminal to play the media information.

11. The method of claim 1, further comprising receiving a capability negotiation packet from the second terminal, wherein the capability negotiation packet initiates performing the capability negotiation.

12. The apparatus of claim 5, wherein the media playback access apparatus is a set top box, wherein the second terminal is a mobile phone, wherein the media information is a media stream, wherein the processor is further configured to convert the media stream according to the media capability of the second terminal to generate a converted media stream, and wherein the processor is configured to send the converted media stream to the second terminal.

13. The apparatus of claim 5, wherein the processor is configured to determine the association relationship by generating a data association table of the association relationship between the URL of the preset picture of the target object and the identifier of the second terminal.

* * * * *

UNITED STATES PATENT AND TRADEMARK OFFICE
CERTIFICATE OF CORRECTION

PATENT NO. : 10,123,066 B2  
APPLICATION NO. : 14/981032  
DATED : November 6, 2018  
INVENTOR(S) : Qinliang Zhang and Yu Zhu Page 1 of 1

It is certified that error appears in the above-identified patent and that said Letters Patent is hereby corrected as shown below:

On the Title Page

Item (30), "Foreign Application Priority Data" section should read:  
Aug. 20, 2013 (CN) .......................................... 201310364535.2  
Feb. 18, 2014 (CN) .......................................... 201410054046.1

In the Claims

Column 41 Claim 5, Line 17 should read:  
A media playback access apparatus, comprising:

Signed and Sealed this  
Twenty-fifth Day of December, 2018

Andrei Iancu  
*Director of the United States Patent and Trademark Office*